US012615213B2

(12) United States Patent
Zhou et al.

(10) Patent No.: US 12,615,213 B2
(45) Date of Patent: Apr. 28, 2026

(54) METHOD AND DEVICE FOR CONTROLLING POWER INTERNET OF THINGS FLOW, AND COMPUTER PROGRAM PRODUCT

(71) Applicant: Zhongshan Power Supply Bureau of Guangdong Power Grid Co Ltd., Zhongshan City (CN)

(72) Inventors: Xiangfeng Zhou, Zhongshan City (CN); Chunyuan Cai, Zhongshan City (CN); Yongjian Li, Zhongshan City (CN); Lifei Li, Zhongshan City (CN); Weixia Jian, Zhongshan City (CN); Yanhe Yin, Zhongshan City (CN); Lei Liu, Zhongshan City (CN); Zhenjiang Chen, Zhongshan City (CN); Hua Li, Zhongshan City (CN); Huibin Zhou, Zhongshan City (CN); Ying Zhang, Zhongshan City (CN); Haoyang Chen, Zhongshan City (CN)

(73) Assignee: ZHONGSHAN POWER SUPPLY BUREAU OF GUANGDONG POWER GRID CO LTD., Zhongshan City (CN)

( * ) Notice: Subject to any disclaimer, the term of this patent is extended or adjusted under 35 U.S.C. 154(b) by 72 days.

(21) Appl. No.: 18/808,821

(22) Filed: Aug. 19, 2024

(65) Prior Publication Data

US 2025/0365243 A1     Nov. 27, 2025

(30) Foreign Application Priority Data

May 21, 2024     (CN) .......................... 202410629884.0

(51) Int. Cl.
*G06F 15/173* (2006.01)
*H04L 47/2483* (2022.01)

(52) U.S. Cl.
CPC ................................. *H04L 47/2483* (2013.01)

(58) Field of Classification Search
CPC ..... H04L 47/12; H04L 47/10; H04L 47/2483; H04L 47/2491
See application file for complete search history.

(56) References Cited

U.S. PATENT DOCUMENTS 10,327,123 B1 * 6/2019 Gitlin ................ H04W 52/0219
11,289,907 B1 * 3/2022 Wells ........................ H02J 3/28
(Continued)

FOREIGN PATENT DOCUMENTS

CN        113905389 A      1/2022
CN        114338428 A      4/2022

OTHER PUBLICATIONS

Wang, Jin; etc; <Smart substation network traffic predition based on improved particle swarm wavelet neural network>; «Engineering Journal of Wuhan University» , Aug. 1, 2015, p. 584-589.

*Primary Examiner* — Suraj M Joshi
*Assistant Examiner* — Hao H Nguyen
(74) *Attorney, Agent, or Firm* — Scully, Scott, Murphy & Presser, P.C.

(57) ABSTRACT

A method and a device for controlling power Internet of Things flow, and a computer program product are provided. The method includes: determining a probability formula for reduction of network user flow, according to probability formulas of signal power over limit, poor quality of service, channel congestion and signal transmission delay occurring in each channel; determining a probability formula for cascading flow reduction of N network users; establishing a network user flow minimum control quantity function according to the probability formula for cascading flow reduction of N network users; determining a plurality of population particles according to a value range corresponding to the parameter of the network user flow minimum (Continued)

control quantity function; and determining the network user flow minimum control function as a fitness function, and optimizing population particles to obtain an optimal population particle. Power Internet of Things flow control is performed according to the optimal population particle.

20 Claims, 3 Drawing Sheets

(56) References Cited

U.S. PATENT DOCUMENTS

| 2012/0130929 | A1* | 5/2012 | Cantin | G06N 3/086 |
| | | | | 706/13 |
| 2015/0271848 | A1* | 9/2015 | Gerasimenko | H04L 47/2433 |
| | | | | 370/338 |
| 2016/0044570 | A1* | 2/2016 | Jeong | H04W 48/16 |
| | | | | 370/338 |
| 2016/0072668 | A1* | 3/2016 | Zeng | H04W 28/082 |
| | | | | 370/254 |
| 2017/0111819 | A1* | 4/2017 | Bando | H04W 28/0289 |
| 2018/0184465 | A1* | 6/2018 | Chatterjee | H04L 41/0618 |

* cited by examiner

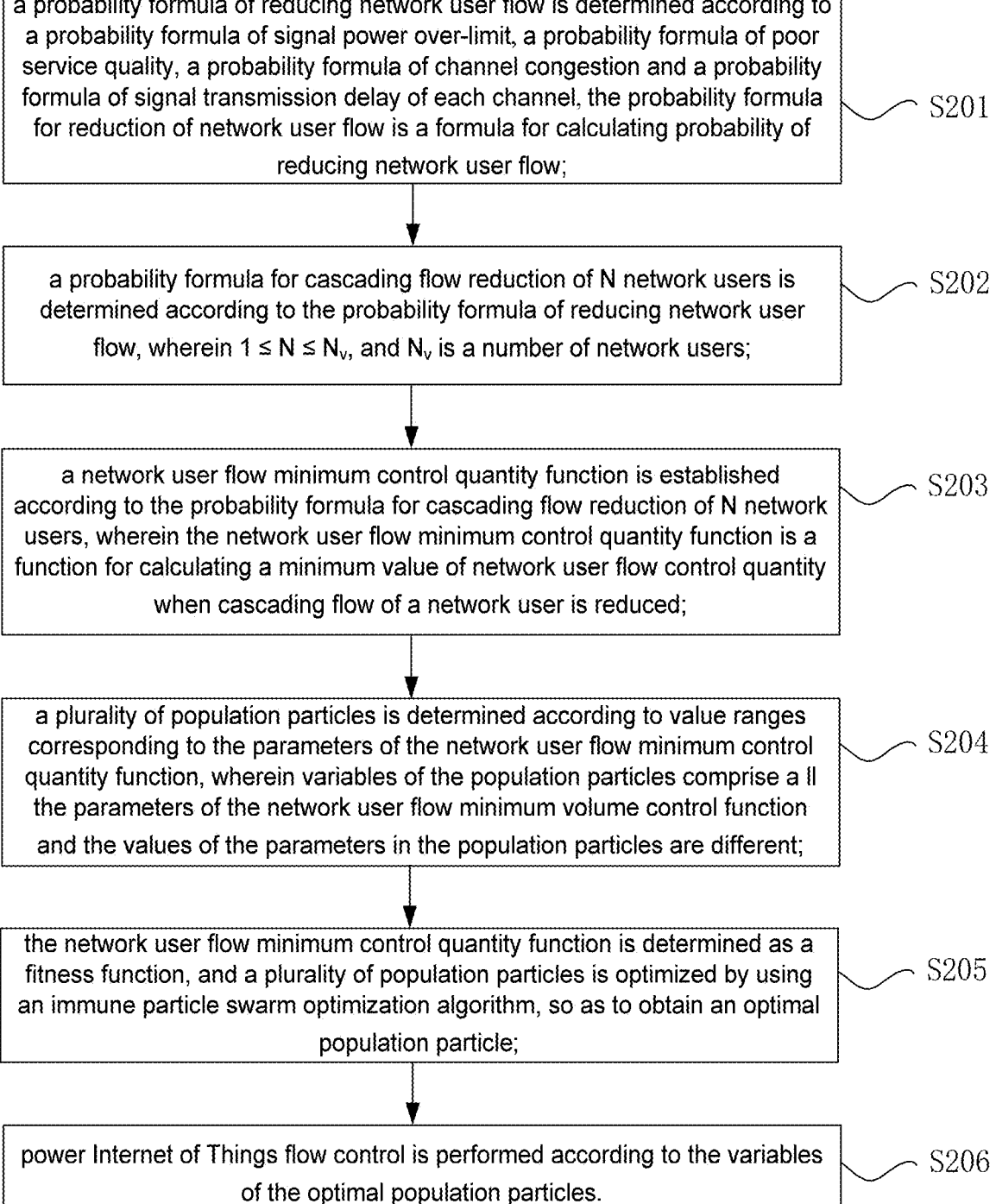

a probability formula of reducing network user flow is determined according to a probability formula of signal power over-limit, a probability formula of poor service quality, a probability formula of channel congestion and a probability formula of signal transmission delay of each channel, the probability formula for reduction of network user flow is a formula for calculating probability of reducing network user flow;

S201 a probability formula for cascading flow reduction of N network users is determined according to the probability formula of reducing network user flow, wherein $1 \leq N \leq N_v$, and $N_v$ is a number of network users;

S202 a network user flow minimum control quantity function is established according to the probability formula for cascading flow reduction of N network users, wherein the network user flow minimum control quantity function is a function for calculating a minimum value of network user flow control quantity when cascading flow of a network user is reduced;

S203 a plurality of population particles is determined according to value ranges corresponding to the parameters of the network user flow minimum control quantity function, wherein variables of the population particles comprise a ll the parameters of the network user flow minimum volume control function and the values of the parameters in the population particles are different;

S204 the network user flow minimum control quantity function is determined as a fitness function, and a plurality of population particles is optimized by using an immune particle swarm optimization algorithm, so as to obtain an optimal population particle;

S205 power Internet of Things flow control is performed according to the variables of the optimal population particles.

METHOD AND DEVICE FOR CONTROLLING POWER INTERNET OF THINGS FLOW, AND COMPUTER PROGRAM PRODUCT

CROSS-REFERENCE TO RELATED APPLICATION

This application claims the benefit of priority to Chinese Patent Application No. 202410629884.0 filed with the Chinese Patent Office on May 21, 2024, the entire disclosure of is incorporated herein by reference.

TECHNICAL FIELD

The present invention relates to the field of network flow control, and in particular, to a method and device for controlling power Internet of Things flow, a computer readable storage medium, and a computer program product.

BACKGROUND

With the continuous advancement of the clean and transformed power supply structure, the difficulty of maintaining the balance of the system is increasing continuously, and the development of the power grid needs to continuously improve the power supply resource configuration capability, which has a powerful flexible adjustment capability. The energy transfer type brings unprecedented uncertainties and operating pressures to the power grid, senses the operating condition of the power grid timely, effectively and comprehensively, and has important significance in the construction of an enhanced digital power grid and an intelligent power grid.

The power Internet of Things can be applied in perception of various stages of the operation of a power grid, which is a product of a combination of a power grid and a network communication technology. In the case where there is no human intervention, autonomous data communication and information interaction between a machine and a machine are achieved, a large number of devices are accessed, TB level data collection is achieved, thereby enhancing the ability of a power grid to accept new energy and achieving management and control of an elastic power grid. Currently, the study on the power Internet of Things is mainly focused on aspects such as architecture and application scenarios and business modes. For power communication, there are a transmission delay test method and a reliability evaluation method. Theoretical analysis and modeling are performed for an access failure that may occur on a power Internet of Things access layer and an occurrence process of the failure. Training theory commonly used in the field of wireless communications is adapted to model communication of a power Internet of Things access layer, and the problem that "concurrent" connection requests of a data acquisition node cause impact on an edge proxy is analyzed and studied. In the field of communications, a queuing theory is often used to analyze the performance of various access algorithms of a link layer and a MAC layer. First using a queuing theory commonly used in the field of wireless communications to model network flow of a power Internet access layer, and then based on the model, simulating an average delay of an edge proxy processing a data packet in a conventional operation condition and a concurrent connection condition. The performance metrics that the edge proxy needs to meet for concurrent connection situations are obtained. Finally, a model is built in the OPNET simulation software, and the validity of the model is verified by using a ZigBee network as an actual network protocol of an access layer.

With the continuous development of communication technologies, telecommunication operators have developed from 2G networks and 3G networks to 4G networks and 5G networks today. Users are increasing continuously, and the huge number of users means that operators have more and more profits. However, in the case that the data service users of the operators are continuously increasing, profitability is not directly proportional to the increasing trend of the users. For this reason, since the telecommunication operator still adopts the traditional data flow management mode in the case of 4G user well spray mode development, the coarse flow management mode results in that the data flow cannot be utilized effectively, and even cannot meet the requirement of people on the surfing rate in some cases. Based on the described reasons, a telecommunication operator has to change an existing coarse management mode and perform fine management on data flow according to requirements, so as to achieve the purposes of suppressing the unlimited use of data flow, improving the experience degree of differentiated users, improving the utilization rate of data flow and maximizing the profit of the operator.

The operator cannot manage the flow according to the current management and control mode if he wants to give a profit. At present, there is a new breakthrough in the flow management mode to meet people's requirements for flow and achieve the objectives of profit of operators. Currently, a solution of refined management and control for data flow is relatively simple, and different data flow types are classified mainly according to demands of different users for different data services, and then a corresponding flow management and control mechanism is established according to a user location, a user terminal type, an access network, and the like. The flow management and control mechanism mainly centers on the type of the service required by the user to be provided, refines the user, and provides differentiated services for the user. The main practice is to first make corresponding flow management and control measures by analyzing user requirements and regulating as required. In a process of implementing a long-term flow management and control measure, a user adapts to a rule continuously, cultivates a usage habit, and then improves a deficiency according to the usage habit of the user, so as to continuously improve a flow management and control policy.

On the basis of a PCC policy architecture proposed by a 3GPP organization, an organization develops a UPCC having an independent production right according to reality, the policy provides a user with policies, such as a short message mail reminding service, QoS, a blocking service, and a rate change, by taking multi-dimensional considerations of the number of users, a user position, a roaming state, a consumption quota, a flow usage time period, a user handheld terminal type, a mobile phone access manner, and the like. The RCP policy proposed by another organization is a flow safety management policy specially studied by telecommunication operators, and the policy is also designed for a template according to the PCC architecture proposed by the 3GPP organization. The main feature of the policy is that flow management and control are performed according to access of users to networks of different modes, and a diversity package service is provided for the users to meet requirements of different types of users.

Another method for managing and controlling data flow mainly includes three aspects. First, network flow is offloaded by other techniques. For example, when a customer's mobile data flow fee exceeds a specified amount; the customer can use the company's provisioned WIFI for free. The number of internets used by indoor users also increases year by year, and in order to solve the demand for indoor users to access the Internet, many telecommunication operators put forward a Femtocell service. A Femtocell is a small base station having the same system as a macro base station. Femtocell has unique features, such as low manufacturing costs, low power consumption, low pollution to the environment, unlimited installation environment, rich access modes, and providing required bandwidth, and is favored by users. Secondly, most telecom operators use the Ethernet technology to optimize the transmission network, and increase the capacity and transmission rate of the transmission network to meet people's requirements for the data flow rate. In a third aspect, an operator establishes an intelligent pipe, performs overall planning on an entire network resource, performs overall deployment, and maximizes resource utilization. Maximization of benefits is achieved by means of upgrade of flow charging function and division of user priorities.

In addition, a scholarly proposes a concept of Access Control Encryption (ACE), which gives the original security of the ACE and provides two construction solutions. The first construction scheme is based on the ElGamal encryption scheme, but its application scenarios are limited to small-scale systems, i.e., the case of few user access control levels exists in the system. Because the ciphertext size is linearly related to the number of access levels in the system, the scale of the system is increased, and the communication overhead is greatly increased. A second structured approach is based on a randomized function encryption (sFE) that relies on an Indistinguishability Obfuscation (IO) assumption. This solution is more efficient, but relies on a stronger assumption, making it difficult to instantiate the solution in a real scenario. In this regard, many scholars have conducted a lot of research efforts, and have achieved a lot of research results. For example, an ACE scheme based on a Learning With Errors (LWE) assumption is constructed, which solves the first problem. Their solution is improved on the first, so the ciphertext size is also linearly related to the system access control level. A scholarly proposed ACE scheme based on standard pairing assumptions solves the second problem. For three limited access control strategies, they propose three ACE solutions and compress the ciphertext to scale to O(polylog(n)). Some problems and solutions existing in the existing security definition are pointed out by the organizers, an enhanced security definition is proposed, and a construction solution meeting the stronger security definition is provided. Manufacturers have constructed an ACE scheme that is based on standard assumptions and supports arbitrary access control strategies. Some scholarly proposed and implemented access control encryption (FH-ACE) schemes that meet the full homomorphic nature. While ensuring data confidentiality and providing fine-grained access control, operations on the ciphertext are also supported. A scholarly proposed ACE scheme having a plurality of third parties and a compact ciphertext size, the scheme can resist a single point failure problem, and is more reliable in practical use. A doctor has proposed trust management based on authorization delegation, the method comprises "PolicyMaker" and "KeyNote", authorization delegation is bound to a public key, and authorization certificates of the devices are identified based on mutual trust relationships. Jo-sangn3 proposes a trust management model based on subjective logic. The model uses a series of subjective logic operators to compute and extrapolate trust values. However, due to limited resources in the Internet of Things, lack of centralized servers and dynamic change of network topology makes it difficult to apply authorization delegation to the Internet of Things. A student uses an entropy function to represent a trust relationship between nodes, and the method can dynamically calculate the trust relationship between the nodes. However, due to the huge scale of the Internet of Things, the method has low performance and poor flexibility. A scholarly researched how to combine a federal identity management system and trust negotiation to better protect user information, a scholarly discussed about how to apply trust management to protect user's identity privacy, but does not provide a specific solution. A theoretic analysis is performed on trust control in a heterogeneous network by college, but does not solve a problem of resource limitation of a device. In the existing literature, the authors define different trust attributes in pervasive computing, which are high-level trust relationships, but do not give performance metrics. Different users or systems often require different user levels and language labels of variables, B, to represent the output variables of the rule. With regard to a trust model of each Atr and B system level, practical Internet of Things applications usually require a mixed trust mode to be represented by member functions respectively. There is a document application fuzzy method for providing a trust-based access control mechanism and performing access control by applying access feedback. However, the method is not suitable for Internet of Things of a distributed structure. A scholarly introduces environmental predicate expression context information based on an RBAC96 model, adopts first-order logic as a policy description language, proposes an OASIS universal access control model, and solves the problem of context inference, Choi et al. The present invention introduces a context concept on the basis of a BAC model, proposes an adaptive access control framework in a ubiquitous environment, and realizes dynamic access control through different access control algorithms. In the current literature, the authors propose a context-based access control architecture for a ubiquitous computing collaborative environment. In order to meet the requirements of enterprises and pervasive computing, there are documents providing dynamic context-aware access control models on the basis of a task role-based access control model and a role-based access control model, respectively. On the basis of the trust model, a trust-based fuzzy access control model is proposed in literature, and an application example proves the effectiveness of the model. For pervasive computing environments, schoolmates propose actor-and trust-based dynamic access control models based on the RBAC model. There is literature proposed two pervasive computational access control models based on time space constraints and on entity trustworthiness. It can be seen that most of the current proposed generic access control models introduce concepts such as trust and context on the basis of traditional access control models such as RBAC. However, the dynamically changing context information causes a complexity of a role, and a limited energy source of a universal device cannot process a complex role relationship.

SUMMARY

The main purpose of the present application is to provide a method and device for controlling power Internet of Things flow, a computer readable storage medium and a computer program product.

In order to achieve the described object, according to one aspect of the present application, provided is a method for controlling power Internet of Things flow, including: a probability formula of network user flow is reduced is determined according to a probability formula of signal power over-limit, a probability formula of poor quality of service, a probability formula of channel congestion and a probability formula of signal transmission delay occurring in each channel; according to a probability formula that network user flow is reduced, determining a probability formula that cascading flow of N network users is reduced, wherein $1 \leq N \leq N_v$, and $N_v$ is a number of network users; a network user flow minimum control quantity function is established according to a probability formula that cascading flow of N network users is reduced, wherein the network user flow minimum control quantity function is a function for calculating a minimum value of network user flow control quantity when cascading flow of a network user is reduced; a plurality of population particles are determined according to value ranges corresponding to parameters of the network user flow control quantity function, wherein variables of the population particles comprise all the parameters of the network user flow minimum control quantity function and the values of the parameters in the population particles are different; the network user flow function is determined as a fitness function, and optimizing a plurality of population particles by using an immune particle swarm optimization algorithm, so as to obtain an optimal population particle; power Internet of Things flow control is performed according to the variables of the optimal population particles.

Optionally, before the probability formula that the network user flow is decreased is determined according to the probability formula that the signal power exceeds the limit, the quality of service is poor, the channel is blocked, and the signal transmission delay occurs in each channel, the method includes: the probability formula of signal power over-limit of each channel $$p_{Li,t}^P = \exp\left[\frac{K_{Li,t}^P\left(P_{Li,t} - P_{Li,t}^{re}\right)}{P_{Li,t}^{re}}\right] - k_{Li,t}^P$$

is established, wherein $$k_{Li,t}^P$$

is an influence coefficient of a signal power of an i-th channel on flow control at a moment t, $P_{Li,t}$ is the signal power of the i-th channel at the moment t, and $$P_{Li,t}^{re}$$

is the maximum signl power allowed for the i-th channel at the moment t, $$K_{Li,t}^P$$

is the power control coefficient of the i-th channel signal at the moment t; the probability formula of poor quality of service occurring in each channel $$p_{Li,t}^S = \exp\left[\frac{K_{Li,t}^S\left(S_{Li,t} - S_{Li,t}^{re}\right)}{S_{Li,t}^{re}}\right] - k_{Li,t}^S$$

is established, wherein $$k_{Li,t}^S$$

is an influence coefficient of quality of service of the i-th channel on flow control at a moment t, $S_{Li,t}$ is quality of service of the i-th channel at the moment t, $$S_{Li,t}^{re}$$

designs normal quality of service of the i-th channel at the moment t, $$K_{Li,t}^S$$

and is a quality of service control coefficient of the i-th channel at the moment t; the probability formula of channel congestion occurring in each channel $$p_{Li,t}^{ZS} = \exp\left(\frac{V_{Li,t}}{K_{Li,t}^{ZS}} - 1\right) - k_{Li,t}^{ZS}$$

is established, wherein $$k_{Li,t}^{ZS}$$

is an influence coefficient of the i-th channel blocking state on flow control at a moment t, $V_{Li,t}$ is a blocking degree of the i-th channel at the moment t, and $$K_{Li,t}^{ZS}$$

is a bandwidth coefficient related to factors such as a channel design parameter and flow control; the probability formula of transmission delay occurring in each channel $$p_{Li,t}^{SY} = \exp\left(\frac{t_{Li,t}}{K_{Li,t}^{SY}} - 1\right) - k_{Li,t}^{SY}$$

is established, wherein $$k_{Li,t}^{SY}$$

is an influence coefficient of the i-th channel transmission time at a moment t on flow control, $t_{Li,t}$ is a signal transmission time of the i-th channel at the moment t, and $$K_{Li,t}^{SY}$$

is a coefficient related to factors such as a channel design parameter and flow control.

Optionally, a probability formula that the network user flow is decreased is determined according to probability formulas that a signal power exceeding limit occurs on each channel, quality of service is poor, a channel is blocked, and a signal transmission delay, including: the probability of one or more of signal power over-limit, service quality under-fault, channel blockage and signal transmission delay occurring in any channel is calculated according to a probability formula of the signal power over-limit, the service quality under-fault, the channel blockage and the signal transmission delay occurring in each channel, obtain a probability formula $$p_L = 1 - \prod_{i=1}^{N_L}\left(1 - p_{Li,t}^P\right) - \prod_{i=1}^{N_L}\left(1 - p_{Li,t}^S\right) - \prod_{i=1}^{N_L}\left(1 - p_{Li,t}^{ZS}\right) - \prod_{i=1}^{N_L}\left(1 - p_{Li,t}^{SY}\right)$$

that network user flow is decreased.

Optionally, according to a probability formula of network user flow is reduced, a probability formula of N network users suffering cascading flow is reduced is determined includes: according to a probability formula $P_L$ of network user flow is reduced, a probability formula of N network users suffering cascading flow is reduced is determined, $$p_v^{MU} = \begin{cases} p_L & \text{1 network user traffic is decreased} \\ k_v^{2U} p_L & \text{2 network user traffic is decreased} \\ k_v^{3U} p_L & \text{3 network user traffic is decreased} \\ \vdots \\ k_v^{N_v U} p_L & N_v \text{ network user traffic is decreased} \end{cases},$$

$$p_v^{MU}$$

which is the probability of network users suffering cascading flow is reduced, and $$k_V^{2U}, k_V^{3U}, \ldots, k_V^{N_V U}$$

are respectively coefficients of 2, 3, . . . , $N_v$ network users suffering cascading flow is reduced.

Optionally, a network user flow minimum control quantity function is established according to a probability formula that cascading flow of N network users is decreased, the method includes: a network user flow control quantity function $$V_V^{MU} = V_{1V}p_L + (V_{1V} + V_{2V})k_V^{2FL}k_V^{2U}p_L + \ldots + k_V^{N_V FL}k_V^{N_V U}p_L\sum_{n=1}^{N_V} V_{nV}$$

is determined according to a probability formula $$p_V^{MU}$$

that cascading flow of N network users is reduced, wherein $$V_V^{MU}$$

is the control quantity when cascading flow of a plurality of network users is reduced; $V_{jv}$ is the flow control quantity of a j-th user when cascading flow of network users is reduced;

$$k_V^{1FL}, k_V^{1FL}, k_V^{2FL}, k_V^{3FL}, \ldots, k_V^{N_V FL}$$

the percentage of the flow control quantity when the concatenation flow of two, three, . . . , $N_v$ network users is reduced, respectively; a network user flow minimum control magnitude function min $$V_V^{MU}$$

is determined according to the network user flow control quantity function $$V_V^{MU}.$$

Optionally, the network user flow volume function is determined as a fitness function, and the plurality of population particles are optimized using an immune particle population optimization algorithm to obtain optimal population particles, including: the fitness of each population particle is calculated; the number of iterations t is set to be 1, and iteration calculation is started; a first calculation step of calculating the concentration of the population particles; the population particles of which the fitness is higher than the average value and the concentration is lower than the average value are divided into subpopulations $S_A$, and the remaining population particles are divided into subpopulations $S_B$; a first update step: position update is performed on the sub-group $S_A$, a population particle fitness of the updated sub-group $S_A$ is calculated, and individual optimality $$p_{beat\_A}^t$$

of the sub-group $S_A$ is updated according to a particle swarm adaptation competition mechanism; a vaccination step, vaccine information is extracted according to a vaccine selection method, and the subgroup $S_B$ is vaccinated; a second calculation step, the fitness of the sub-group $S_B$ is calculated after vaccination, and the individual optimum $$p_{beat\_B}^t$$

of the sub-group $S_B$ is updated according to a fitness competition mechanism; a second updating step: an updated sub-group $S_A$ and a sub-group $S_B$ are vaccinated into a population $S_C$, position updating is performed on the population $S_C$, a population fitness of the updated population $S_C$ is calculated, and individual optimality $$p_{beat}^t$$

and global optimality $$p_{gbeat}^t$$

of the updated population $S_C$ are updating according to a fitness competition mechanism; the first calculation step, the division step, the first updating step, the seed adding step, the second calculation step and the second updating step are repeated at least once in sequence until the individual optimal $$p_{beat}^t$$

and the global optimal $$p_{gbeat}^t$$

meet a target requirement or the number of iterations t is greater than a maximum number of iterations, and calculating an exit cycle and outputting the optimal population particles.

Optionally, performing power Internet of Things flow control according to the parameters of the optimal population particles includes: a flow control quantity of each of the network users is determined according to the parameters of the optimal population particles, so that the sum of all the flow control quantities of the network users is the smallest.

According to another aspect of the present application, provided is a device for controlling power Internet of Things flow, including: a first determination unit for determining a probability formula of reducing network user flow according to the probability formulas of signal power over-limit, service quality under-fault, channel congestion and signal transmission delay occurring in each channel; a second determining unit, configured to determine, according to a probability formula that network user flow is decreased, a probability formula that cascading flow of N network users is decreased, wherein $1 \leq N \leq N_v$, and $N_v$ is the number of network users; a first establishing unit, configured to establish a network user flow minimum control quantity function according to a probability formula that cascading flow of N network users is reduced, wherein the network user flow minimum control quantity function is a function for calculating a minimum value of a network user flow control quantity when cascading flow of a network user is reduced; a third determining unit, configured to determine a plurality of population particles according to value ranges corresponding to the parameters of the network user flow control quantity function, wherein the population particles include all the parameters and different parameter values in the population particles are different; a fourth determination unit for determining said network user flow control function as a fitness function, and using an immune particle swarm optimization algorithm to perform optimization on a plurality of said population particles so as to obtain an optimal population particle; a control unit for performing power Internet of Things flow control according to the parameters of the optimal population particles.

According to another aspect of the present application, a computer-readable storage medium is provided. The computer-readable storage medium includes a stored program. When the program runs, the computer-readable storage medium is controlled to execute any one of the methods described above.

According to a further aspect of the present application, there is provided a computer program product, including computer programs/instructions, wherein the computer programs/instructions implement any method when being executed by a processor.

BRIEF DESCRIPTION OF THE DRAWINGS

FIG. 2 shows a schematic flowchart of a method for controlling power Internet of Things flow according to an example of the present application;

The figures include the following reference signs:

102: processor; 104: storage; 106: transmission device; 108: input/output device.

DETAILED DESCRIPTION OF EMBODIMENTS

It is important to note that the examples of the present disclosure and the characteristics in the examples can be combined under the condition of no conflicts. The present disclosure will be described below with reference to the drawings and examples in detail.

To make persons skilled in the art better understand the solutions of the present application, the following clearly and completely describes the technical solutions in the examples of the present application with reference to the accompanying drawings in the examples of the present application. Apparently, the described examples are merely a part rather than all of the examples of the present application. All other examples obtained by a person of ordinary skill in the art based on the examples of the present application without creative efforts shall belong to the scope of protection of the present application.

It should be noted that the terms "first" and "second" in the description, claims, and accompanying drawings of the present application are used to distinguish similar objects, and are not necessarily used to describe a specific sequence or order. It should be understood that the data so used may be interchanged where appropriate for the examples of the present application described herein. In addition, the terms "include" and "have", and any variations thereof, are intended to cover a non-exclusive inclusion, for example, a process, method, system, product, or device that includes a series of steps or units is not necessarily limited to those steps or units that are expressly listed, but may include other steps or units that are not expressly listed or inherent to such process, method, product, or device.

As introduced in the background art, network user flow is reduced in the prior art, which affects user experience. To solve the problem, examples of the present application provide a method and device for controlling power Internet of Things flow, a computer readable storage medium, and a computer program product.

The following clearly and completely describes the technical solutions in the examples of the present invention with reference to the accompanying drawings in the examples of the present invention.

Figure 1:
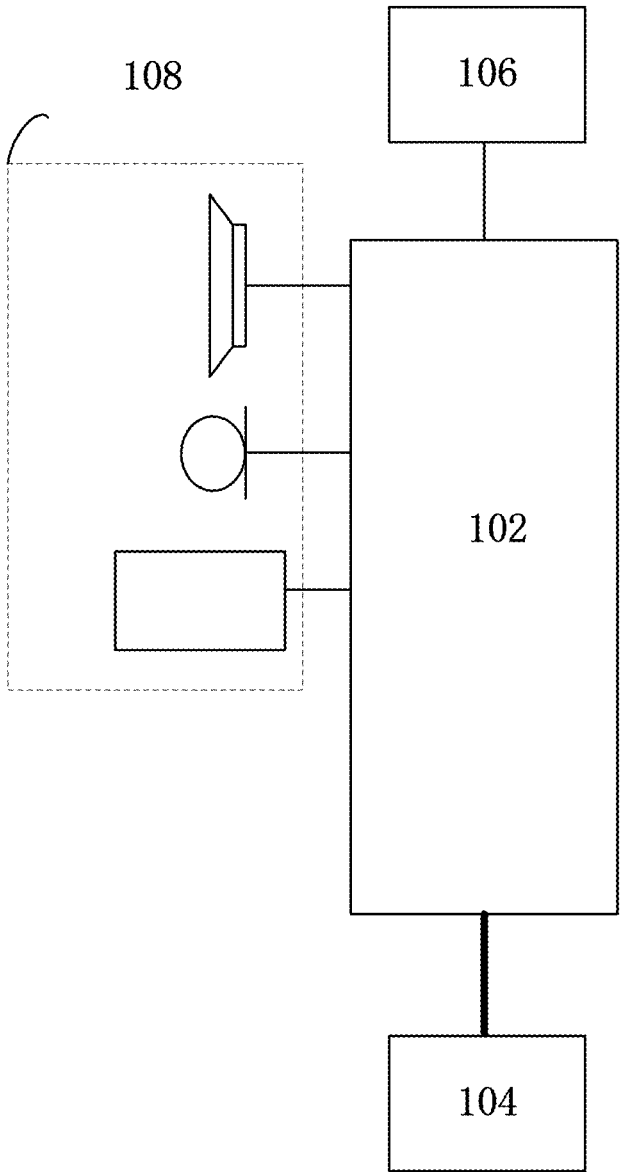
FIG. 1 shows a hardware structure block diagram of a mobile terminal for executing a method for controlling power Internet of Things flow according to an example of the present application.

The method examples provided in the examples of the present application may be implemented in a mobile terminal, a computer terminal, or a similar computing device. Taking running on a mobile terminal as an example, FIG. 1 is a hardware structure block diagram of a mobile terminal of a method for controlling power Internet of Things flow according to an embodiment of the present invention. As shown in FIG. 1, the mobile terminal may include one or more (only one is shown in FIG. 1) processors 102 (the processors 102 may include, but are not limited to, a processing device such as a microprocessor MCU or a programmable logic device FPGA) and a memory 104 for storing data, wherein the mobile terminal can further include a transmission device 106 and an input/output device 108 for a communication function. A person of ordinary skill in the art may understand that the structure shown in FIG. 1 is merely exemplary, which does not limit the structure of the foregoing mobile terminal. For example, the mobile terminal may further include more or less components than shown in FIG. 1, or have a different configuration from that shown in FIG. 1.

The memory 104 may be configured to store a computer program, for example, a software program and a module of application software, such as a computer program corresponding to the device information display method in the embodiment of the present invention, the processor 102 runs the computer program stored in the memory 104, so as to execute various function applications and data processing, that is, implement the foregoing method. Memory 104 may include high-speed random access memory, and may also include non-volatile memory, such as one or more magnetic storage devices, flash memory, or other non-volatile solid-state memory. In some instances, memory 104 may further include memory remotely located with respect to processor 102, which may be connected to mobile terminals over a network. Examples of such networks include, but are not limited to, the Internet, intranets, local area networks, mobile communication networks, and combinations thereof. The transmission device 106 is used to receive or transmit data via a network. Specific examples of the described network may include a wireless network provided by a communication provider of the mobile terminal. In one example, the transmission device 106 may include a Network Interface Controller (NIC) that may be coupled to other network devices via a base station to communicate with the Internet. In one example, the transmission device 106 may be a Radio Frequency (RF) module for communicating wirelessly with the Internet.

In this example, a method for controlling power Internet of Things flow running on a mobile terminal, a computer terminal or a similar computing device is provided, it should be noted that the steps shown in the flowchart of the drawings can be executed in a computer system such as a group of computer executable instructions, furthermore, although a logic sequence is shown in the flowchart, in some cases, the shown or described steps may be executed in a sequence different from that described here.

FIG. 2 is a flowchart of a method for controlling power Internet of Things flow according to an example of the present application. As shown in FIG. 2, the method includes the following steps:

Step S201, a probability formula of reducing network user flow is determined according to a probability formula of signal power over-limit, a probability formula of poor service quality, a probability formula of channel congestion and a probability formula of signal transmission delay of each channel, the probability formula for reduction of network user flow is a formula for calculating probability of reducing network user flow;

Step S202, a probability formula for cascading flow reduction of N network users is determined according to the probability formula of reducing network user flow, wherein $1 \le N \le N_v$, and $N_v$ is a number of network users;

Step S203, a network user flow minimum control quantity function is established according to the probability formula for cascading flow reduction of N network users, wherein the network user flow minimum control quantity function is a function for calculating a minimum value of network user flow control quantity when cascading flow of a network user is reduced;

Step S204, a plurality of population particles is determined according to value ranges corresponding to the parameters of the network user flow minimum control quantity function, wherein variables of the population particles comprise all the parameters of the network user flow minimum control quantity function and the values of the parameters in the population particles are different;

Step S205, the network user flow minimum control quantity function is determined as a fitness function, and a plurality of population particles is optimized by using an immune particle swarm optimization algorithm, so as to obtain an optimal population particle;

Step S206: power Internet of Things flow control is performed according to the variables of the optimal population particles.

In the described method for controlling power Internet of Things flow, in the method, a flow function of network user flow control is established as a fitness function, namely, an immune particle swarm optimization algorithm can be used to optimize a plurality of population particles, so as to obtain an optimal population particle, in this way, power Internet of Things flow control can be performed according to variables corresponding to the optimal population particle, so as to ensure that the flow control quantity of a network user is the minimum when the flow of the network user is reduced, the present invention ensures reliability of power Internet of Things performance, and solves the problem in the prior art that network user flow is reduced and the user experience is affected.

In order to consider the influence of a network user signal power over-limit, poor service quality, channel congestion and signal transmission delay on flow, in an optional implementation, before a probability formula of reducing network user flow is determined according to a probability formula of signal power over-limit, a probability formula of poor service quality, a probability formula of channel congestion and a probability formula of signal transmission delay of each channel, the method includes:

Step S301, the probability formula of signal power over-limit occurring in each channel $$p_{Li,t}^{P} = \exp\left[\frac{K_{Li,t}^{P}\left(P_{Li,t} - P_{Li,t}^{re}\right)}{P_{Li,t}^{re}}\right] - k_{Li,t}^{P}$$

is established, wherein $$k_{Li,t}^{P}$$

is an influence coefficient of a signal power of an i-th channel at a moment t on flow control, $P_{Li,t}$ is a signal power of the i-th channel at the moment t, $$P_{Li,t}^{re}$$

is a maximum signal power allowed for the i-th channel at the moment t, and $$K_{Li,t}^{P}$$

is a signal power control coefficient of the i-th channel at the moment t;

Step S302, the probability formula of poor quality of service occurring in each channel $$p_{Li,t}^{S} = \exp\left[\frac{K_{Li,t}^{S}\left(S_{Li,t} - S_{Li,t}^{re}\right)}{S_{Li,t}^{re}}\right] - k_{Li,t}^{S}$$

is established, wherein $$k_{Li,t}^{S}$$

is an influence coefficient of quality of service of the i-th channel on flow control at a moment t, $S_{Li,t}$ is quality of service of the i-th channel at the moment t, $$S_{Li,t}^{re}$$

is normal quality of service of the i-th channel at the moment t, and $$K_{Li,t}^{S}$$

is a quality of service control coefficient of the i-th channel at the moment t;

Step S303, the probability formula of channel congestion occurring in each channel $$p_{Li,t}^{ZS} = \exp\left(\frac{V_{Li,t}}{K_{Li,t}^{ZS}} - 1\right) - k_{Li,t}^{ZS}$$

is established, wherein $$k_{Li,t}^{ZS}$$

is an influence coefficient of the i-th channel blocking state on flow control at a moment t, $V_{Li,t}$ is a blocking degree of the i-th channel at the moment t, and $$K_{Li,t}^{ZS}$$

is a bandwidth coefficient related to a channel design parameter and flow control;

Step S304, the probability formula of signal transmission delay occurring in each channel $$p_{Li,t}^{SY} = \exp\left(\frac{t_{Li,t}}{K_{Li,t}^{SY}} - 1\right) - k_{Li,t}^{SY}$$

is established, wherein $$k_{Li,t}^{SY}$$

is an influence coefficient of the i-th channel transmission time at a moment t on flow control, $t_{Li,t}$ is a signal transmission time of the i-th channel at the moment t, and $$K_{Li,t}^{SY}$$

is a coefficient related to a channel design parameter and flow control.

In the above embodiments, $$p_{Li,t}^{P},\ p_{Li,t}^{S},\ p_{Li,t}^{ZS},\ \text{and}\ p_{Li,t}^{SY},$$

are respectively the probabilities of considering that the i-th channel has a signal power over limit, a service quality is poor, a channel is blocked and a signal transmission delay, it can be obtained by calculation using a corresponding formula; when a signal power over-limit occurs on a channel, the quality of service is poor, the channel is blocked, and a signal transmission delay occurs, the flow of a network user is reduced, in this way, the probability that the network user flow is decreased may be determined according to the probabilities of signal power over limit, poor quality of service, channel blockage, and signal transmission delay occurring on the channel.

In order to accurately calculate the probability of network user flow reduction, in an optional embodiment, step S201 includes:

Step S2011: one or more probabilities of signal power over limit, poor quality of service, channel congestion, and signal transmission delay occurring in any channel are calculated according to the probability formula of the signal power over-limit, the quality of service under-limit, the channel blockage, and the signal transmission delay occurring in each channel, so as to obtain the probability formula for reduction of network user flow $$p_L = 1 - \prod_{i=1}^{N_L}\left(1 - p_{Li,t}^{P}\right) - \prod_{i=1}^{N_L}\left(1 - p_{Li,t}^{S}\right) - \prod_{i=1}^{N_L}\left(1 - p_{Li,t}^{ZS}\right) - \prod_{i=1}^{N_L}\left(1 - p_{Li,t}^{SY}\right),$$

$N_L$ is a number of channel.

In the above embodiment, it is assumed that the network user and the primary network have $N_L$ channel connections, taking into account that the power of the network user signal is overrun, the service quality is poor, the channel is blocked, and the transmission delay of the signal, the flow loss probability $P_L$ of a network user may be obtained by calculation using a corresponding formula, that is, a probability that at least one of a signal power over limit, a quality of service (QoS) grade, a channel blockage, and a signal transmission delay occurs in any channel.

In order to determine the probability of flow of different number of network users is reduced, in an optional embodiment, step S202 includes:

Step S2021: according to the probability formula for reduction of network user flow $p_L$, the probability formula for cascading flow reduction of N network users, $$p_V^{MU} = \begin{cases} p_L & \text{1 network user traffic is decreased} \\ k_V^{2U} p_L & \text{2 network user traffic is decreased} \\ k_V^{3U} p_L & \text{3 network user traffic is decreased} \\ \vdots \\ k_V^{N_V U} p_L & N_V \text{ network user traffic is decreased} \end{cases}$$

is determined, $$p_V^{MU}$$

is a probability of network users suffering cascading flow is reduced, and $$k_V^{2U}, k_V^{3U}, \dots, k_V^{N_V U}$$

re respectively coefficients of 2, 3, . . . , $N_v$ network users suffering cascading flow is reduced.

In the above embodiment, it is assumed that there are $N_V$ network users, and the influences of signal power exceeding limit, service quality being poor, channel congestion and signal transmission delay are considered, the probability $$p_V^{MU}$$

that the cascaded flow of network users is decreased is calculated according to a corresponding formula, so that the probability that the flow of different number of network users is decreased can be conveniently calculated, the coefficient by which cascading flow of a network user is decreased is an empirical coefficient, and may be obtained through experiments, in this way, the probability that the flow of different number of users in the network is decreased can be calculated.

In order to accurately calculate a network user flow control quantity when network user flow is demoted, in an optional embodiment, the step S203 includes:

step S2031, a network user flow control quantity function $$V_V^{MU} = V_{1V} p_L + (V_{1V} + V_{2V})k_V^{2FL} k_V^{2U} p_L + \dots + k_V^{N_V FL} k_V^{N_V U} p_L \sum_{n=1}^{N_V} V_{nV}$$

is determined according to the probability formula for cascading flow reduction of N network users $$p_V^{MU},$$

wherein $$V_V^{MU}$$

is the flow control quantity when cascading flow of a plurality of network users is reduced, $V_{1v}, V_{2v} \dots V_{nv}$ are the flow control quantity of the first user, the second user, . . . , the nth user when the cascading flow of the network user is reduced;

$$k_V^{1FL}, k_V^{2FL}, k_V^{3FL} \dots, k_V^{N_V FL}$$

are the percentage of the flow control quantity when the cascading flow of one two, three, . . . , $N_v$ network users is reduced, respectively;

Step S2032: the network user flow minimum control quantity function $$\min V_V^{MU}$$

is determined according to the network user flow control quantity function $$V_V^{MU}.$$

In the described embodiments, under the influence of signal power exceeding limit, service quality being insufficient, channel obstruction, and signal transmission delay, the flow is usually reduced; the flow control quantity $$V_V^{MU}$$

of a network user can be calculated through a corresponding formula; and when cascade flow of the network user is reduced, the objective of flow control is to minimize the flow control quantity of the network user. Network user flow minimum control magnitude function $$\min V_V^{MU}$$

for network user flow control when cascading flow of network users is reduced. In addition, when cascading flow of a network user is demoted, the percentage of the flow control is an empirical coefficient, and can be obtained through experiments.

It should be noted that, the constraint condition corresponding to the network user flow minimum control quantity function is as follows:

(1) Constraint Condition of User Signal Flow

The i-th user signal flow is required to satisfy a requirement condition that is greater than a maximum value allowed therefor and less than a minimum value allowed therefor:

$$\underline{V}_{Vi} \le V_{Vi} \le \overline{V}_{Vi}$$

Where $V_{Vi}$, $\overline{V}_{Vi}$, and $\underline{V}_{Vi}$ is the actual value, allowed maximum value, and allowed minimum value of the signal flow of the i-th subscriber respectively.

(2) Constraint Condition of User Signal Transmission Speed

The i-th user signal transmission speed is required to satisfy a requirement condition greater than a minimum value allowed thereby:

$$\underline{v}_{Vi} \le v_{Vi}$$

wherein $v_{Vi}$, $\underline{v}_{Vi}$ are respectively an actual value and an allowed minimum value of an i-th user signal transmission speed.

(3) Constraint for Channel Flow

The i-th channel flow is required to satisfy a requirement condition which is greater than a maximum value allowed therefor and less than a minimum value allowed therefor:

$$\underline{V}_{Xi} \le V_{Xi} \le \overline{V}_{Xi}$$

Wherein $V_{Xi}$, $\overline{V}_{Xi}$, $\underline{V}_{Xi}$ is the i-th channel flow actual value, allowed maximum value, and minimum value respectively.

(4) Constraint Condition of Channel Transmission Speed

The i-th channel transmission speed is required to satisfy the requirements of being greater than the allowed maximum value and being less than the allowed minimum value:

$$\underline{v}_{Xi} \le v_{Xi} \le \overline{v}_{Xi}$$

Wherein $v_{Xi}$, $\overline{v}_{Xi}$, $\underline{v}_{Xi}$ is the i-th channel transmission speed actual value, allowed maximum value and minimum value respectively.

(5) Constraint for Web Services Quality

The network service quality is required to satisfy a requirement condition which is greater than the allowed maximum value and less than the allowed minimum value:

$$\underline{k}_{QoS} \le k_{QoS} \le \overline{k}_{QoS}$$

In the formula, $k_{QoS}$, $\overline{k}_{QoS}$, $\underline{k}_{QoS}$ is the actual QoS value, maximum allowable value and minimum allowable value respectively.

(6) Constraint Conditions for Signal Transmission Delay

The i-th channel signal transmission time delay should satisfy the requirements of being greater than a maximum value allowed therefor and being less than a minimum value allowed therefor:

$$\underline{t}_{Xi} \le t_{Xi} \le \overline{t}_{Xi}$$

Wherein $t_{Xi}$, $\overline{t}_{Xi}$, $\underline{t}_{Xi}$ is the actual value, allowable maximum value and minimum value of the signal transmission delay of the i-th channel respectively.

(7) Constraint for Signal Power

The i-th user signal power is required to meet a requirement that is greater than a maximum value allowed by the i-th user signal power and less than a minimum value allowed by the i-th user signal power:

$$\underline{P}_{Ui} \le P_{Ui} \le \overline{P}_{Ui}$$

Where $P_{Ui}$, $\overline{P}_{Ui}$, $\underline{P}_{Ui}$ is the actual value, maximum value and minimum value of the power of the i-th user signal respectively.

(8) Constraint Conditions for Node Blocking

The i-th node blocking is required to meet the requirement condition that is greater than its allowed maximum value and less than its allowed minimum value:

$$\underline{R}_i \le R_i \le \overline{R}_i$$

In the formula, $R_i$, $\overline{R}_i$, $\underline{R}_i$ is the blocking actual value, allowed maximum value, and allowed minimum value of the i-th node respectively.

In order to solve the optimal solution, in an optional embodiment, step S205 includes:

Step S2051, fitness of each population particle is calculated;

Step S2052, a number of iterations t is set to be 1, and iteration calculation is started;

Step S2053, a first calculation step, concentration of the described population particles is calculated;

Step S2054, a division step: the population particles with the fitness higher than the average value and the concentration lower than the average value are divided into a subgroup $S_A$, and the remaining population particles are divided into a subgroup $S_B$;

Step S2055, a first update step, the position of the described sub-group $S_A$ is updated to obtain updated sub-group $S_A$, the population particle fitness of the updated sub-group $S_A$ is calculated, and the individual optimum $$p^t_{best\_A}$$

of the sub-group $S_A$ is updated according to a particle swarm adaptation competition mechanism;

Step S2056, a vaccination step, vaccine information is extracted according to a vaccine selection method, and the described sub-group $S_B$ is vaccinated to obtain vaccinated sub-group $S_B$;

Step S2057, a second calculation step, fitness of the vaccinated sub-group $S_B$ is calculated and individual optimality $$p_{best\_B}^t$$

of the vaccinated sub-group $S_B$ is updated according to the fitness competition mechanism;

Step S2058, a second update step, the updated sub-group $S_A$ and the vaccinated sub-group $S_B$ are synthesized into a population $S_C$, performing position updating on the population $S_C$ to obtain updated population $S_C$, multiple population fitness of the updated population $S_C$ is calculated and individual optimality $$p_{best}^t$$

and global optimality $$p_{gbest}^t$$

of the updated population $S_C$ is updated according to the fitness competition mechanism;

Step S2059, the first calculation step, the division step, the first update step, the vaccination step, the second calculation step and the second update step are repeated at least once in sequence until the individual optimal $$p_{best}^t$$

and the global optimal $$p_{gbest}^t$$

meet a target requirement or the number of iterations t is greater than a maximum number of iterations, and exited cycle and the optimal population particle is outputted.

In the described embodiments, a training sample is preprocessed, a model parameter and a population are initialized, an initial population particle fitness is calculated, an iteration count t is set to be 1, and iteration calculation is started; calculating a particle concentration; calculating a particle concentration $\rho(x_i)$, $$\rho(x_i) = \sum_{j=1}^{N} \begin{cases} 1 & 0.95 \le \dfrac{x_i}{x_j} \le 1.01 \\ 0 & \text{others} \end{cases}, d(x_i) = \frac{\rho(x_i)}{N}, i = 1, 2, \dots, N,$$

using a concentration mechanism based on a Hamming distance, which is substantively a ratio corresponding to an attribute between the i-th particle and other particles, $x_i$ is an i-th particle at a spatial position, $x_j$ is an i-th particle at a spatial position, and N is the number of particles, partitioning the population particles having the fitness higher than the average and the concentration lower than the average into a subpopulation $S_A$, the remaining population particles are divided into a sub-population $S_B$; a first update step: performing position update on the sub-group $S_A$, calculating a population particle fitness of the updated sub-group $S_A$, and updating individual optimality $$p_{best\_A}^t$$

of the sub-group $S_A$ according to a particle swarm adaptation competition mechanism; a vaccination step, extracting vaccine information according to a vaccine selection method, and vaccinating the described sub-group $S_B$; a second calculation step, calculating the fitness of the sub-group $S_B$ after vaccination, and updating the individual optimum $$p_{best\_B}^t$$

of the sub-group $S_B$ according to a fitness competition mechanism; a second updating step: synthesizing an updated sub-group $S_A$ and a sub-group $S_B$ vaccinated into a population $S_C$, performing position updating on the population $S_C$, calculating a population fitness of the updated population $S_C$, and updating individual optimality and global optimality of the updated population $S_C$ according to a fitness competition mechanism; repeating at least one of the first calculating step, the dividing step, the first updating step, the seed adding step, the second calculating step, and the second updating step in this order, until the individual optimal $$p_{best}^t$$

and the global optimal $$p_{gbest}^t$$

meet a target requirement or the number t of iterations is greater than the maximum number of iterations, calculating an exit loop and outputting the described optimal population particles, so that an immune particle group-based optimization regularization learning machine can be used to solve the optimal population particles.

To facilitate flow control, in an optional embodiment, the foregoing step S206 includes:

Step S2061: the flow control quantity of each network user is determined according to the parameter of the optimal population particle, so that the sum of flow control quantities of all the network users is the smallest.

In the foregoing embodiment, a minimum value of a sum of flow control quantities of network users is determined according to the parameters of the optimal population particles, and a flow control quantity of each of the network users is determined, thereby reducing the flow control quantity of the network users and improving user experience, the flow control quantity is the amount of flow reduction.

It should be noted that, the steps shown in the flowchart of the drawings can be executed in a computer system such as a set of computer executable instructions, and although the logic order is shown in the flowchart, in some cases, the shown or described steps can be executed in an order different from that described here.

Examples of the present application further provide a device for controlling power Internet of Things flow. It should be noted that, the device for controlling power Internet of Things flow in the examples of the present application can be used for executing the control method for power Internet of Things flow provided in the examples of the present application. The device is configured to implement the described example and example implementation mode, and what has been described will not be elaborated. The term "module", as used hereinafter, is a combination of software and/or hardware capable of realizing a predetermined function. Although the device described in the following example is preferably implemented by software, implementation of hardware or a combination of software and hardware is also possible and conceived.

The following introduces a device for controlling power Internet of Things flow according to examples of the present application.

Figure 3:
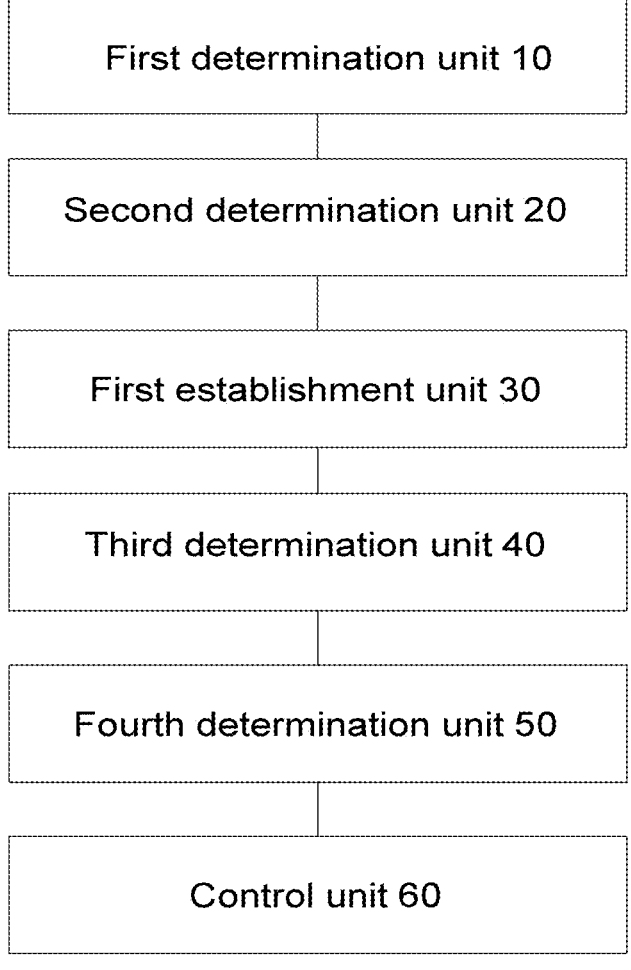
FIG. 3 shows a structure diagram of a device for controlling the Internet of Things flow of electric power according to an example of the present application.

FIG. 3 is a structural block diagram of a device for controlling power Internet of Things flow according to an example of the present application. As shown in FIG. 3, the device includes:

A first determination unit 10, which is used for determining a probability formula of network user flow reduction according to the probability formulae of a signal power over-limit, a poor quality of service, channel congestion and a signal transmission delay occurring in each channel;

A second determination unit 20, configured to determine, according to a probability formula that network user flow is decreased, a probability formula that cascading flow of N network users is decreased, where $1 \leq N \leq N_v$, and $N_v$ is the number of network users;

A first establishment unit 30, configured to establish a network user flow minimum control magnitude function according to a probability formula that cascading flow of N network users is reduced, where the network user flow minimum control magnitude function is a function for calculating a minimum value of network user flow control quantities when cascading flow of the network users is reduced;

A third determination unit 40, configured to determine a plurality of population particles according to value ranges corresponding to the parameters of the network user flow control quantity function, where the population particles include all the parameters, and values of the parameters in the population particles are different;

A fourth determination unit 50 for determining the described network user flow control function as a fitness function, and performing optimization on the plurality of population particles using an immune particle swarm optimization algorithm so as to obtain an optimal population particle;

A control unit 60, configured to perform power Internet of Things flow control according to the parameters of the optimal population particles.

In the described device for controlling power Internet of Things flow, the device uses a flow control function of a network user as a fitness function, namely, an immune particle swarm optimization algorithm can be used to optimize a plurality of population particles, so as to obtain an optimal population particle, in this way, power Internet of Things flow control can be performed according to a parameter corresponding to an optimal population particle, so as to ensure that the flow control quantity of a network user is the smallest when the flow of the network user is reduced, the present invention ensures reliability of power Internet of Things performance, and solves the problem in the prior art that network user flow is reduced and the user experience is affected.

In order to consider the influence of a network user signal power over-limit, a poor quality of service, channel blockage, and a signal transmission delay on flow, in an optional embodiment, the described device includes:

A second establishment unit, which is used for, before determining a probability formula for reducing network user flow according to the probability formulas for generating a signal power over-limit, a poor quality of service, channel congestion and a signal transmission delay of each channel, establishing a probability formula $$p_{Li,t}^{p} = \exp\left[\frac{K_{Li,t}^{p}\left(P_{Li,t} - P_{Li,t}^{re}\right)}{P_{Li,t}^{re}}\right] - k_{Li,t}^{p}$$

of a signal power over-limit of a channel, wherein $$k_{Li,t}^{p}$$

is an influence coefficient of a signal power of an i-th channel on flow control at a moment t, $P_{Li,t}$ is the signal power of the i-th channel at the moment t, and $$P_{Li,t}^{re}$$

is the maximum signal power allowed for the i-th channel at the moment t, $$K_{Li,t}^{P}$$

is the power control coefficient of the i-th channel signal at the moment t;

A third establishment unit, which is used for establishing a probability formula $$p_{Li,t}^{S} = \exp\left[\frac{K_{Li,t}^{S}\left(S_{Li,t} - S_{Li,t}^{re}\right)}{S_{Li,t}^{re}}\right] - k_{Li,t}^{S}$$

of poor quality of service occurring in a channel, wherein $$k_{Li,t}^{S}$$

is an influence coefficient of quality of service of the i-th channel on flow control at the moment t, $S_{Li,t}$ is quality of service of the i-th channel at the moment t, $$S_{Li,t}^{re}$$

is designed to be normal quality of service of the i-th channel at the moment t, $$K_{Li,t}^{S}$$

and is a quality of service control coefficient of the i-th channel at the moment t;

A fourth establishment unit, which is used for establishing a probability formula $$p_{Li,t}^{ZS} = \exp\left(\frac{V_{Li,t}}{K_{Li,t}^{ZS}} - 1\right) - k_{Li,t}^{ZS}$$

of channel blocking occurring in a channel, wherein $$k_{Li,t}^{ZS}$$

is an influence coefficient of the i-th channel blocking state on flow control at a moment t, $V_{Li,t}$ is a blocking degree of the i-th channel at the moment t, and $$K_{Li,t}^{ZS}$$

is a bandwidth coefficient related to factors such as a channel design parameter and flow control;

A fifth establishment unit for establishing a probability formula $$p_{Li,t}^{ST} = \exp\left(\frac{t_{Li,t}}{K_{Li,t}^{SY}} - 1\right) - k_{Li,t}^{SY}$$

of a signal transmission delay of a channel, wherein $$k_{Li,t}^{SY}$$

is an influence coefficient of the i-th channel transmission time at a moment t on flow control, $t_{Li,t}$ is a signal transmission time of the i-th channel at the moment t, and $$K_{Li,t}^{SY}$$

is a coefficient related to factors such as a channel design parameter and flow control.

In the above embodiments, $$p_{Li,t}^{P}, \ p_{Li,t}^{S}, \ p_{Li,t}^{ZS} \text{ and } p_{Li,t}^{SY},$$

are respectively the probabilities of considering that the i-th channel has a signal power over limit, a service quality is poor, a channel is blocked and a signal transmission delay, it can be obtained by calculation using a corresponding formula; when a signal power over-limit occurs on a channel, the quality of service is poor, the channel is blocked, and a signal transmission delay occurs, the flow of a network user is reduced, in this way, the probability that the network user flow is decreased may be determined according to the probabilities of signal power over limit, poor quality of service, channel blockage, and signal transmission delay occurring on the channel.

In order to accurately calculate the probability of network user flow reduction, in an optional embodiment, the first determination unit includes:

A first determination module for calculating, according to a probability formula of a signal power over-limit, a quality of service under-fault, a channel blockage and a signal transmission delay occurring in each channel, the probability of one or more of the following: the signal power over-limit, the quality of service under-fault, the channel blockage and the signal transmission delay occurring in any channel, so as to obtain a probability formula $$p_L = 1 - \prod_{i=1}^{N_L}\left(1 - p_{Li,t}^{P}\right) - \prod_{i=1}^{N_L}\left(1 - p_{Li,t}^{S}\right) - \prod_{i=1}^{N_L}\left(1 - p_{Li,t}^{ZS}\right) - \prod_{i=1}^{N_L}\left(1 - p_{Li,t}^{SY}\right)$$

of network user flow being reduced.

In the above embodiment, it is assumed that the network user and the primary network have $N_L$ channel connections, taking into account that the power of the network user signal is overrun, the service quality is poor, the channel is blocked, and the transmission delay of the signal, the flow loss probability $P_L$ of a network user may be obtained by calculation using a corresponding formula. Because at least one of a signal power over limit, a poor quality of service, channel congestion, and a signal transmission delay occurring in any channel causes flow loss of the network user, by calculating the probability of this situation, the flow decrease probability $P_L$ of the network user can be obtained.

In order to determine the probability of network user flow is reduced, in an optional embodiment, the second determination unit includes:

A second determining module, configured to determine, according to a probability formula $P_L$ for decreasing network user flow, a probability formula for decreasing cascade flow of N network users, $$p_V^{MU} = \begin{cases} p_L & 1 \text{ network user traffic is decreased} \\ k_V^{2U} p_L & 2 \text{ network user traffic is decreased} \\ k_V^{3U} p_L & 3 \text{ network user traffic is decreased} \\ \vdots \\ k_V^{N_V U} p_L & N_V \text{ network user traffic is decreased} \end{cases}$$

$$p_V^{MU}$$

which is a probability for decreasing the cascade flow of the N network users, and $$k_V^{2U}, k_V^{3U}, \dots, k_V^{N_V U}$$

is a coefficient for decreasing the cascade flow of 2, 3, . . . , $N_v$ network users, respectively.

In the above embodiment, it is assumed that there are $N_V$ network users, and the influences of signal power exceeding limit, service quality being poor, channel congestion and signal transmission delay are considered, the probability $$p_V^{MU}$$

that the cascaded flow of network users is decreased is calculated according to a corresponding formula, so that the probability that the flow of different number of network users is decreased can be conveniently calculated, he coefficient by which cascading flow of a network user is decreased is an empirical coefficient, and may be obtained through experiments, in this way, the probability that the flow of different number of users in the network is decreased can be calculated.

In order to accurately calculate a network user flow control quantity when network user flow is demoted, in an optional embodiment, the first establishment unit includes:

A third determining module, configured to determine a network user flow control quantity function $$V_V^{MU} = V_{1V} p_L + (V_{1V} + V_{2V}) k_V^{2FL} V_V^{2U} p_L + \ldots + k_V^{N_V FL} k_V^{N_V U} p_L \sum_{n=1}^{N_v} V_{nV}$$

according to a probability formula $$p_V^{MU}$$

that cascading flow of N network users is reduced, wherein $$V_V^{MU}$$

is the amount of flow timed to be controlled when cascading flow for multiple network users, $V_{jV}$ is the flow control quantity of a j-th user when cascading flow of network users is reduced;

$$k_V^{1FL}, k_V^{2FL}, k_V^{3FL}, \ldots, k_V^{N_V FL}$$

the percentage of the flow control quantity when the concatenation flow of two, three, . . . , $N_v$ network users is reduced, respectively;

And a fourth determination module, configured to determine a network user flow minimum control quantity function $$\min V_V^{MU}$$

according to the network user flow control quantity function $$V_V^{MU}.$$

In the described embodiments, under the influence of signal power exceeding limit, service quality being insufficient, channel obstruction, and signal transmission delay, the flow is usually reduced; the flow control quantity $$V_V^{MU}$$

of a network user can be calculated through a corresponding formula; and when cascade flow of the network user is reduced, the objective of flow control is to minimize the flow control quantity of the network user. Network user flow minimum control magnitude function $$\min V_V^{MU}$$

for network user flow control when cascading flow of network users is reduced. In addition, when cascading flow of a network user is demoted, the percentage of the flow control is an empirical coefficient, and can be obtained through experiments.

It should be noted that, the constraint condition corresponding to the network user flow minimum control quantity function is as follows:

(1) Constraint Condition of User Signal Flow

The i-th user signal flow is required to satisfy a requirement condition that is greater than a maximum value allowed therefor and less than a minimum value allowed therefor:

$$\underline{V}_{Vi} \leq V_{Vi} \leq \overline{V}_{Vi}$$

Where $V_{Vi}$, $\overline{V}_{Vi}$, $\underline{V}_{Vi}$ are the actual values, allowed maximum value, and allowed minimum value of the signal flow of the i-th subscriber respectively.

(2) Constraint Condition of User Signal Transmission Speed

The i-th user signal transmission speed is required to satisfy a requirement condition greater than a minimum value allowed thereby:

$$\underline{v}_{Vi} \leq v_{Vi}$$

Wherein $v_{Vi}$, $\underline{v}_{Vi}$ are respectively an actual value and an allowed minimum value of an i-th user signal transmission speed.

(3) Constraint for Channel Flow

The i-th channel flow is required to satisfy a requirement condition which is greater than a maximum value allowed therefor and less than a minimum value allowed therefor:

$$\underline{V}_{Xi} \leq V_{Xi} \leq \overline{V}_{Xi}$$

Where $V_{Xi}$, $\overline{V}_{Xi}$, $\underline{V}_{Xi}$ are the actual value of the channel flow, the maximum allowable value, and the minimum allowable value, respectively.

(4) Constraint Condition of Channel Transmission Speed

The i-th channel transmission speed is required to satisfy the requirements of being greater than the allowed maximum value and being less than the allowed minimum value:

$$\underline{v}_{Xi} \leq v_{Xi} \leq \overline{v}_{Xi}$$

Where $v_{Xi}$, $\overline{v}_{Xi}$, $\underline{v}_{Xi}$ are the actual value of the channel transmission speed, the maximum value allowed, and the minimum value allowed.

(5) Constraint for Web Services Quality

The network service quality is required to satisfy a requirement condition which is greater than the allowed maximum value and less than the allowed minimum value:

$$\underline{k}_{QoS} \leq k_{QoS} \leq \overline{k}_{QoS}$$

In the formula, $k_{QoS}$, $\overline{k}_{QoS}$, $\underline{k}_{QoS}$ are the actual QoS value, the maximum allowable value and the minimum allowable value respectively.

(6) Constraint Conditions for Signal Transmission Delay

The i-th channel signal transmission time delay should satisfy the requirements of being greater than a maximum value allowed therefor and being less than a minimum value allowed therefor:

$$\underline{t}_{Xi} \leq t_{Xi} \leq \overline{t}_{Xi}$$

Where $t_{Xi}$, $\overline{t}_{Xi}$, $\underline{t}_{Xi}$ is the actual value of the signal transmission delay of the i-th channel, and is the maximum allowable value and the minimum allowable value respectively.

(7) Constraint for Signal Power

The i-th user signal power is required to meet a requirement that is greater than a maximum value allowed by the i-th user signal power and less than a minimum value allowed by the i-th user signal power:

$$\underline{P}_{Ui} \leq P_{Ui} \leq \overline{P}_{Ui}$$

Where $P_{Ui}$, $\overline{P}_{Ui}$, $\underline{P}_{Ui}$ is the actual value of the power of the i-th user signal, and is the maximum allowable value and the minimum allowable value respectively.

(8) Constraint Conditions for Node Blocking

The i-th node blocking is required to meet the requirement condition that is greater than its allowed maximum value and less than its allowed minimum value:

$$\underline{R}_i \leq R_i \leq \overline{R}_i$$

In the formula, $R_i$, $\overline{R}_i$, $\underline{R}_i$ is the blocking actual value, allowed maximum value, and allowed minimum value of the i-th node respectively.

In order to solve the optimal solution, in an optional embodiment, the fourth determining unit includes:

A first calculation module for calculating the fitness of each of the described population particles;

A second calculation module, configured to enable the number t of iterations to be 1, and start iteration calculation;

A third calculation module for calculating the concentration of the population particles in a first calculation step;

A dividing module for executing a dividing step, and dividing the described population particles, the fitness of which is higher than the average value and the concentration of which is lower than the average value, into a sub-population $S_A$, and dividing the remaining population particles into a sub-population $S_B$;

A first updating module used for executing a first updating step, updating the position of the described sub-group $S_A$, calculating the population particle fitness of the updated sub-group $S_A$, and updating individual optimality $$p_{best\_A}^t$$

of the sub-group $S_A$ according to a particle swarm adaptation competition mechanism;

A vaccination module for performing vaccination steps, extracting vaccine information according to a vaccine selection mode, and vaccinating the described sub-group $S_B$;

A fourth calculation module for executing a second calculation step, calculating the fitness of the sub-group $S_B$ after vaccination, and updating the individual optimum $$p_{best\_B}^t$$

of the sub-group $S_B$ according to a fitness competition mechanism;

A second updating module used for executing a second updating step, combining the updated sub-group $S_A$ and the sub-group $S_B$ vaccinated into a population $S_C$, updating the position of the population $S_C$, calculating the fitness of the species of the updated population $S_C$, and updating the individual optimality $$p_{best}^t$$

and global optimality $$p_{gbest}^t$$

of the updated population $S_C$ according to a fitness competition mechanism;

A repeating module, configured to repeat at least one of the first calculating step, the classifying step, the first updating step, the seed collecting step, the second calculating step, and the second updating step in sequence until the individual optimal $$p_{best}^t$$

and the global optimal $$p_{gbest}^t$$

meet a target requirement or the number of iterations t is greater than a maximum number of iterations, and calculate an exit cycle and output the optimal population particle.

In the described embodiments, a training sample is pre-processed, a model parameter and a population are initialized, an initial population particle fitness is calculated, an iteration count t is set to be 1, and iteration calculation is started; calculating a particle concentration; calculating a particle concentration $\rho(x_i)$, $$\rho(x_i) = \sum_{j=1}^{N} \begin{cases} 1 & 0.95 \le \dfrac{x_i}{x_j} \le 1.01 \\ 0 & \text{others} \end{cases}, d(x_i) = \dfrac{\rho(x_i)}{N}, i = 1, 2, \dots, N,$$

using a concentration mechanism based on a Hamming distance, which is substantively a ratio corresponding to an attribute between the i-th particle and other particles, $x_i$ is an i-th particle at a spatial position, $x_j$ is an j-th particle at a spatial position, and N is the number of particles, partitioning the population particles having the fitness higher than the average and the concentration lower than the average into a subpopulation $S_A$, the remaining population particles are divided into a sub-population $S_B$; a first update step: performing position update on the sub-group $S_A$, calculating a population particle fitness of the updated sub-group $S_A$, and updating individual optimality $$p_{best\_A}^t$$

of the sub-group $S_A$ according to a particle swarm adaptation competition mechanism; a vaccination step, extracting vaccine information according to a vaccine selection method, and vaccinating the described sub-group $S_B$; a second calculation step, calculating the fitness of the sub-group $S_B$ after vaccination, and updating the individual optimum $$p_{best\_B}^t$$

of the sub-group $S_B$ according to a fitness competition mechanism; a second updating step: synthesizing an updated sub-group $S_A$ and a sub-group $S_B$ vaccinated into a population $S_C$, performing position updating on the population $S_C$, calculating a population fitness of the updated population $S_C$, and updating individual optimality $$p_{gbest}^t$$

and global optimality $$p_{best}^t$$

of the updated population $S_C$ according to a fitness competition mechanism; repeating at least one of the first calculating step, the dividing step, the first updating step, the seed adding step, the second calculating step, and the second updating step in this order, until the individual optimal $$p_{best}^t$$

and the global optimal $$p_{gbest}^t$$

meet a target requirement or the number t of iterations is greater than the maximum number of iterations, calculating an exit loop and outputting the described optimal population particles, so that an immune particle group-based optimization regularization learning machine can be used to solve the optimal population particles.

In order to facilitate flow control, in an optional embodiment, the control unit includes:

And a fifth determination module, configured to determine a flow control quantity of each network user according to the parameter of the optimal population particle, so that a sum of flow control quantity of all the network users is the smallest.

In the foregoing embodiment, a minimum value of a sum of flow control quantities of network users is determined according to the parameters of the optimal population particles, and a flow control quantity of each of the network users is determined, thereby reducing the flow control quantity of the network users and improving user experience.

The above-mentioned control device for the power Internet of Things flow includes a processor and a memory, wherein the described first determination unit, second determination unit, first establishment unit, third determination unit, fourth determination unit and control unit, etc. are all stored in the memory as program units, and the processor executes the described program units stored in the memory to realize corresponding functions, all the described modules are located in the same processor; alternatively, the modules are located in different processors in an arbitrary combination.

The processor includes a kernel, and the kernel calls a corresponding program unit from a memory. One or more cores may be disposed, and a core parameter is adjusted to solve the problem in the prior art that network user flow is reduced and user experience is affected.

The memory may include a non-permanent memory in a computer readable medium, a random access memory (RAM), and/or a non-volatile memory, such as a read-only memory (ROM) or a flash RAM, and the memory includes at least one memory chip.

Examples of the present invention provide a computer readable storage medium. The computer readable storage medium includes a stored program. The program, when running, controls a device where the computer readable storage medium is located to execute a control method for the power Internet of Things flow.

Specifically, the method for controlling the flow of electricity Internet of Things includes:

Step S201, a probability formula of reducing network user flow is determined according to a probability formula of signal power over-limit, a probability formula of poor service quality, a probability formula of channel congestion and a probability formula of signal transmission delay of each channel, the probability formula for reduction of network user flow is a formula for calculating probability of reducing network user flow;

Step S202, a probability formula for cascading flow reduction of N network users is determined according to the probability formula of reducing network user flow, wherein $1 \leq N \leq N_v$, and $N_v$ is a number of network users;

Step S203, a network user flow minimum control quantity function is established according to the probability formula for cascading flow reduction of N network users, wherein the network user flow minimum control quantity function is a function for calculating a minimum value of network user flow control quantity when cascading flow of a network user is reduced;

Step S204, a plurality of population particles is determined according to value ranges corresponding to the parameters of the network user flow minimum control quantity function, wherein variables of the population particles comprise all the parameters of the network user flow minimum control quantity function and the values of the parameters in the population particles are different;

Step S205, the network user flow minimum control quantity function is determined as a fitness function, and a plurality of population particles is optimized by using an immune particle swarm optimization algorithm, so as to obtain an optimal population particle;

Step S206: power Internet of Things flow control is performed according to the variables of the optimal population particles.

Examples of the present invention provide a processor. The processor is used for running a program. The program executes, during running, the method for controlling the described power Internet of Things flow.

Specifically, the method for controlling the flow of electricity Internet of Things includes:

Step S201, a probability formula of reducing network user flow is determined according to a probability formula of signal power over-limit, a probability formula of poor service quality, a probability formula of channel congestion and a probability formula of signal transmission delay of each channel, the probability formula for reduction of network user flow is a formula for calculating probability of reducing network user flow;

Step S202, a probability formula for cascading flow reduction of N network users is determined according to the probability formula of reducing network user flow, wherein $1 \leq N \leq N_v$, and $N_v$ is a number of network users;

Step S203, a network user flow minimum control quantity function is established according to the probability formula for cascading flow reduction of N network users, wherein the network user flow minimum control quantity function is a function for calculating a minimum value of network user flow control quantity when cascading flow of a network user is reduced;

Step S204, a plurality of population particles is determined according to value ranges corresponding to the parameters of the network user flow minimum control quantity function, wherein variables of the population particles comprise all the parameters of the network user flow minimum control quantity function and the values of the parameters in the population particles are different;

Step S205, the network user flow minimum control quantity function is determined as a fitness function, and a plurality of population particles is optimized by using an immune particle swarm optimization algorithm, so as to obtain an optimal population particle;

Step S206: power Internet of Things flow control is performed according to the variables of the optimal population particles.

The examples of the present invention provides a device, the device includes a processor, a memory and a program stored in the memory and capable of running on the processor. When the processor executes the program, at least the following steps are implemented:

Step S201, a probability formula of reducing network user flow is determined according to a probability formula of signal power over-limit, a probability formula of poor service quality, a probability formula of channel congestion and a probability formula of signal transmission delay of each channel, the probability formula for reduction of network user flow is a formula for calculating probability of reducing network user flow;

Step S202, a probability formula for cascading flow reduction of N network users is determined according to the probability formula of reducing network user flow, wherein $1 \leq N \leq N_v$, and $N_v$ is a number of network users;

Step S203, a network user flow minimum control quantity function is established according to the probability formula for cascading flow reduction of N network users, wherein the network user flow minimum control quantity function is a function for calculating a minimum value of network user flow control quantity when cascading flow of a network user is reduced;

Step S204, a plurality of population particles is determined according to value ranges corresponding to the parameters of the network user flow minimum control quantity function, wherein variables of the population particles comprise all the parameters of the network user flow minimum control quantity function and the values of the parameters in the population particles are different;

Step S205, the network user flow minimum control quantity function is determined as a fitness function, and a plurality of population particles is optimized by using an immune particle swarm optimization algorithm, so as to obtain an optimal population particle;

Step S206: power Internet of Things flow control is performed according to the variables of the optimal population particles.

The present application further provides a computer program product, which, when being executed on a data processing device, is suitable for executing a program for initializing at least the following method steps:

Step S201, a probability formula of reducing network user flow is determined according to a probability formula of signal power over-limit, a probability formula of poor service quality, a probability formula of channel congestion and a probability formula of signal transmission delay of each channel, the probability formula for reduction of network user flow is a formula for calculating probability of reducing network user flow;

Step S202, a probability formula for cascading flow reduction of N network users is determined according to the probability formula of reducing network user flow, wherein $1 \leq N \leq N_v$, and $N_v$ is a number of network users;

Step S203, a network user flow minimum control quantity function is established according to the probability formula for cascading flow reduction of N network users, wherein the network user flow minimum control quantity function is a function for calculating a minimum value of network user flow control quantity when cascading flow of a network user is reduced;

Step S204, a plurality of population particles is determined according to value ranges corresponding to the parameters of the network user flow minimum control quantity function, wherein variables of the population particles comprise all the parameters of the network user flow minimum control quantity function and the values of the parameters in the population particles are different;

Step S205, the network user flow minimum control quantity function is determined as a fitness function, and a plurality of population particles is optimized by using an immune particle swarm optimization algorithm, so as to obtain an optimal population particle;

Step S206: power Internet of Things flow control is performed according to the variables of the optimal population particles.

Obviously, those skilled in the art should understand that the described modules and steps of the present invention can be realized by a universal computing device, they may be centralized on a single computing device or distributed on a network composed of a plurality of computing devices, they can be implemented by program codes executable by a computing device, and thus can be stored in a storage device and executed by the computing device, furthermore, in some cases, the shown or described steps may be executed in an order different from that described here, or they are made into integrated circuit modules respectively, or a plurality of modules or steps therein are made into a single integrated circuit module for implementation. Thus, the present invention is not limited to any specific combination of hardware and software.

Those skilled in the art shall understand that the examples of the present application can be provided as a method, a system or a computer program product. Therefore, the present disclosure may take the form of an entirely hardware example, an entirely software example or an example combining software and hardware. Furthermore, the present application may take the form of a computer program product implemented on one or more computer-usable storage media (including but not limited to a disk memory, a CD-ROM, an optical memory, etc.) containing computer-usable program codes.

The present application is described with reference to the flowcharts and/or block diagrams of the method, device (system), and computer program product according to the examples of the present application. It should be understood that each flow and/or block in the flowcharts and/or block diagrams and combinations of flows and/or blocks in the flowcharts and/or block diagrams can be implemented by computer program instructions. These computer program instructions may be provided to a processor of a general purpose computer, a special purpose computer, an embedded processor or other programmable data processing device to produce a machine, an device that enables instructions executed by a processor of a computer or other programmable data processing devices to generate the functions specified in one or more processes in the flowcharts and/or one or more blocks in the block diagrams.

These computer program instructions may also be stored in a computer-readable memory capable of guiding a computer or other programmable data processing devices to work in a specific manner, so that the instructions stored in the computer-readable memory generate a manufactured product including an instruction device, and the instruction device implements functions specified in one or more flows in the flowchart and/or one or more blocks in the block diagram.

These computer program instructions may also be loaded onto a computer or another programmable data processing device, causing a series of operational steps to be performed on a computer or other programmable device to produce a computer implemented process, thus, the instructions executed on the computer or other programmable devices provide steps for implementing the functions specified in one or more processes in the flowcharts and/or one or more blocks in the block diagrams.

In a typical configuration, the computing device includes one or more processors (CPUs), an input/output interface, a network interface, and memory.

The memory may include a non-permanent storage in a computer readable medium, a random access memory (RAM), and/or a non-volatile memory, such as a read-only memory (ROM) or a flash RAM. A memory is an example of a computer-readable medium.

Computer-readable media, including persistent and non-persistent, removable and non-removable media, may implement information storage by any method or technology. The information may be computer readable instructions, data structures, modules of a program, or other data. Examples of computer storage media include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disc read-only memory (CD-ROM), digital versatile discs (DVD) or other optical storage, magnetic cassettes, A magnetic tape disk storage or other magnetic storage device, or any other non-transmission medium, may be used to store information that may be accessed by a computing device. As defined herein, computer-readable media does not include transitory computer-readable media, such as modulated data signals and carrier waves.

It should also be noted that the terms "include", "include", or any other variation thereof are intended to cover a non-exclusive inclusion, so that a process, a method, a commodity, or a device that includes a series of elements not only includes those elements, but also includes other elements that are not explicitly listed, or further includes inherent elements of the process, the method, the commodity, or the device. Without further limitation, an element limited by "include a . . . " does not exclude other same elements existing in a process, a method, a commodity, or a device that includes the element.

From the above description, it can be seen that the above examples of the present application achieve the following technical effects:

1) In the method for controlling power Internet of Things flow of the present application, the method includes: establishing a network user flow control function as a fitness function, namely, an immune particle swarm optimization algorithm can be used to optimize a plurality of population particles, so as to obtain an optimal population particle, in this way, power Internet of Things flow control can be performed according to a parameter corresponding to an optimal population particle, so as to ensure that the flow control quantity of a network user is the smallest when the flow of the network user is reduced, the present invention ensures reliability of power Internet of Things performance, and solves the problem in the prior art that network user flow is reduced and the user experience is affected.

2) In the described control device for the power Internet of Things flow of the present application, the device uses a flow control function of a network user as a fitness function, namely, an immune particle swarm optimization algorithm can be used to optimize a plurality of population particles, so as to obtain an optimal population particle, in this way, power Internet of Things flow control can be performed according to a parameter corresponding to an optimal population particle, so as to ensure that the flow control quantity of a network user is the smallest when the flow of the network user is reduced, the present invention ensures reliability of power Internet of Things performance, and solves the problem in the prior art that network user flow is reduced and the user experience is affected.

The foregoing descriptions are merely exemplary examples of the present application, but are not intended to limit the present application. For those skilled in the art, the present application may have various modifications and variations. Any modifications, equivalent replacements, improvements and the like made within the spirit and principle of the present application shall belong to the scope of protection of the present application.

What is claimed is:

1. A method for controlling power Internet of Things flow, comprising:

determining a probability formula for reduction of network user flow according to a probability formula of signal power over-limit, a probability formula of poor quality of service, a probability formula of channel congestion and a probability formula of signal transmission delay occurring in each channel, the probability formula for reduction of network user flow is a formula for calculating probability of reducing network user flow;

determining a probability formula for cascading flow reduction of N network users according to the probability formula for reduction of network user flow, wherein $1 \leq N \leq N_v$, and $N_v$ is a number of network users, the probability formula for cascading flow reduction of N network users is a formula for calculating probability of reducing cascading flow of N network users;

establishing a network user flow minimum control quantity function according to the probability formula for cascading flow reduction of N network users, wherein the network user flow minimum control quantity function is a function for calculating a minimum value of network user flow control quantity when cascading flow of N network users is reduced;

determining a plurality of population particles according to value ranges corresponding to parameters of the network user flow minimum control quantity function, wherein variables of the population particles comprise all the parameters of the network user flow minimum control quantity function and the values of the parameters in the population particles are different;

determining the network user flow minimum control quantity function as a fitness function, and optimizing a plurality of population particles by using an immune particle swarm optimization algorithm, so as to obtain an optimal population particle; and performing power Internet of Things flow control according to the parameters of the optimal population particle.

2. The method according to claim 1, wherein before determining the probability formula for reduction of network user flow according to the probability formula of signal power over-limit, the probability formula of poor quality of service, the probability formula of the channel congestion and the probability formula of signal transmission delay occurring in each channel comprises:

establishing the probability formula of signal power over-limit occurring in each channel $$p_{Li,t}^P = \exp\left[\frac{K_{Li,t}^P\left(P_{Li,t} - P_{Li,t}^{re}\right)}{P_{Li,t}^{re}}\right] - k_{Li,t}^P,$$

wherein $$k_{Li,t}^P$$

is an influence coefficient of a signal power of an i-th channel at a moment t on flow control, $P_{Li,t}$ is a signal power of the i-th channel at the moment t, $$P_{Li,t}^{re}$$

is a maximum signal power allowed for the i-th channel at the moment t, and $$K_{Li,t}^P$$

is a signal power control coefficient of the i-th channel at the moment t;

establishing the probability formula of poor quality of service occurring in each channel $$p_{Li,t}^S = \exp\left[\frac{K_{Li,t}^S\left(S_{Li,t} - S_{Li,t}^{re}\right)}{S_{Li,t}^{re}}\right] - k_{Li,t}^S,$$

wherein $$k_{Li,t}^S$$

is an influence coefficient of quality of service of the i-th channel on flow control at a moment t, $S_{Li,t}$ is quality of service of the i-th channel at the moment t, $$S_{Li,t}^{re}$$

is normal quality of service of the i-th channel at the moment t, and $$K_{Li,t}^S$$

is a quality of service control coefficient of the i-th channel at the moment t; establishing the probability formula of channel congestion occurring in each channel $$p_{Li,t}^{ZS} = \exp\left(\frac{V_{Li,t}}{K_{Li,t}^{ZS}} - 1\right) - k_{Li,t}^{ZS},$$

wherein $$k_{Li,t}^{ZS}$$

is an influence coefficient of the i-th channel blocking state on flow control at a moment t, $V_{Li,t}$ a blocking degree of the i-th channel at the moment t, and $$K_{Li,t}^{ZS}$$

is a bandwidth coefficient related to a channel design parameter and flow control;

establishing the probability formula of signal transmission delay occurring in each channel $$p_{Li,t}^{SY} = \exp\left(\frac{t_{Li,t}}{K_{Li,t}^{SY}} - 1\right) - k_{Li,t}^{SY},$$

wherein $$k_{Li,t}^{SY}$$

is an influence coefficient of the i-th channel transmission time at a moment t on flow control, $t_{Li,t}$ is a signal transmission time of the i-th channel at the moment t, and $$k_{Li,t}^{SY}$$

is a coefficient related to a channel design parameter and flow control.

3. The method according to claim 2, wherein determining the probability formula for reduction of network user flow according to the probability formula of signal power over-limit, the probability formula of poor quality of service, the probability formula of channel congestion and the probability formula of signal transmission delay occurring in each channel, the method comprising:

calculating the probability of one or more of signal power over-limit, poor quality of service, channel blockage and signal transmission delay occurring in any channel according to the probability formula of the signal power over-limit, the quality of service under-limit, the channel blockage and the signal transmission delay occurring in each channel, so as to obtain the probability formula for reduction of network user flow $$p_L = 1 - \prod_{i=1}^{N_L}\left(1 - p_{Li,t}^{P}\right) - \prod_{i=1}^{N_L}\left(1 - p_{Li,t}^{S}\right) - \prod_{i=1}^{N_L}\left(1 - p_{Li,t}^{ZS}\right) - \prod_{i=1}^{N_L}\left(1 - p_{Li,t}^{SY}\right),$$

$N_L$ is a number of channel.

4. The method according to claim 3, wherein determining the probability formula for cascading flow reduction of N network users according to the probability formula for reduction of network user flow comprises:

according to the probability formula for reduction of network user flow $p_L$, determining the probability formula for cascading flow reduction of N network users, $$p_v^{MU} = \begin{cases} p_L & 1 \text{ network user traffic is decreased} \\ k_v^{2U}p_L & 2 \text{ network user traffic is decreased} \\ k_v^{2U}p_L & 3 \text{ network user traffic is decreased} \\ \vdots & \\ k_v^{N_vU}p_L & N_v \text{ network user traffic is decreased} \end{cases},$$

$$p_v^{MU}$$

is a probability of network users suffering cascading flow is reduced, and $$k_v^{2u}, k_v^{3U}, \dots, k_v^{N_vU}$$

are respectively coefficients of 2, 3, . . . , $N_v$ network users suffering cascading flow is reduced.

5. The method according to claim 4, wherein establishing the network user flow minimum control quantity function according to the probability formula for cascading flow reduction of N network users comprises:

determining a network user flow control quantity function $$V_v^{MU} = V_{1v}p_L + (V_{1v} + V_{2v})k_v^{2FL}k_v^{2U}p_L + \dots + k_v^{N_vFL}k_v^{N_vU}p_L\sum_{n=1}^{N_v}V_{nv}$$

according to the probability formula for cascading flow reduction of N network users, wherein $$V_v^{MU}$$

is the flow control quantity when cascading flow of a plurality of network users is reduced, $V_{1v}$, $V_{2v}$. . . $V_{nv}$ are the flow control quantity of the first user, the second user, . . . , the nth user when the cascading flow of the network user is reduced;

$$k_v^{1FL}, k_v^{2FI}, k_v^{3FL}, \dots, k_v^{N_vFL}$$

are the percentage of the flow control quantity when the cascading flow of one two, three, . . . , $N_v$ network users is reduced, respectively;

determining the network user flow minimum control quantity function $$\min V_v^{MU}$$

39 according to the network user flow control quantity function $$V_v^{MU}.$$

6. The method according to claim 1, wherein determining the network user flow minimum control function as the fitness function, and optimizing a plurality of population particles by using the immune particle swarm optimization algorithm, so as to obtain the optimal population particle comprises:

calculating fitness of each of the population particles;

setting a number of iterations t to be 1, and starting iteration calculation;

a first calculation step: calculating concentration of the population particles;

a division step: dividing the population particles of which the fitness is higher than an average value of fitness of all the population particles and the concentration is lower than an average value of concentration of all the population particles into sub-group $S_A$, and dividing remaining population particles into sub-group $S_B$;

a first update step: performing position update on the sub-group $S_A$ to obtain updated sub-group SA, calculating multiple population particle fitness of the updated sub-group $S_A$, and updating individual optimality $$p_{best\_A}^t$$

of the sub-group $S_A$ according to a fitness competition mechanism;

a vaccination step, extracting vaccine information according to a vaccine selection method, and vaccinating the subgroup $S_B$ to obtain vaccinated sub-group $S_B$;

a second calculation step, calculating fitness of the vaccinated sub-group $S_B$, and updating individual optimality $$p_{best\_B}^t$$

of the vaccinated sub-group $S_B$ according to the fitness competition mechanism;

a second update step: synthesizing the updated sub-group $S_A$ and the vaccinated sub-group $S_B$ into a population $S_C$, performing position updating on the population $S_C$ to obtain updated population $S_C$, calculating multiple population fitness of the updated population $S_C$, and updating individual optimality $$p_{best}^t$$

and global optimality $$p_{gbest}^t$$

of the updated population $S_C$ according to the fitness competition mechanism;

repeating the first calculation step, the division step, the first update step, the vaccination step, the second calculation step and the second update step at least once in sequence until the individual optimal $$p_{best}^t$$

and the global optimal $$p_{gbest}^t$$

meet a target requirement or the number of iterations t is greater than a maximum number of iterations, and exiting cycle and outputting the optimal population particle.

7. The method according to claim 1, wherein performing power Internet of Things flow control according to the variables of the optimal population particle comprises:

determining the flow control quantity of each network user according to the parameter of the optimal population particle, so that a sum of all the flow control quantity of the network users is the smallest.

8. The method according to claim 2, wherein determining the network user flow minimum control function as the fitness function, and optimizing a plurality of population particles by using the immune particle swarm optimization algorithm, so as to obtain the optimal population particle comprises:

calculating fitness of each of the population particles;

setting a number of iterations t to be 1, and starting iteration calculation;

a first calculation step: calculating concentration of the population particles;

a division step: dividing the population particles of which the fitness is higher than an average value of fitness of all the population particles and the concentration is lower than an average value of concentration of all the population particles into sub-group $S_A$, and dividing remaining population particles into sub-group $S_B$;

a first update step: performing position update on the sub-group $S_A$ to obtain updated sub-group $S_A$, calculating multiple population particle fitness of the updated sub-group $S_A$, and updating individual optimality $$p_{best\_A}^t$$

of the sub-group $S_A$ according to a fitness competition mechanism;

a vaccination step, extracting vaccine information according to a vaccine selection method, and vaccinating the subgroup $S_B$ to obtain vaccinated sub-group $S_B$;

a second calculation step, calculating fitness of the vaccinated sub-group $S_B$, and updating individual optimality $$p_{best\_B}^t$$

of the vaccinated sub-group $S_B$ according to the fitness competition mechanism;

a second update step: synthesizing the updated sub-group $S_A$ and the vaccinated sub-group $S_B$ into a population $S_C$, performing position updating on the population $S_C$ to obtain updated population $S_C$, calculating multiple population fitness of the updated population $S_C$, and updating individual optimality $$p_{best}^t$$

and global optimality $$p_{gbest}^t$$

of the updated population $S_C$ according to the fitness competition mechanism;

repeating the first calculation step, the division step, the first update step, the vaccination step, the second calculation step and the second update step at least once in sequence until the individual optimal $$p_{best}^t$$

and the global optimal $$p_{gbest}^t$$

meet a target requirement or the number of iterations t is greater than a maximum number of iterations, and exiting cycle and outputting the optimal population particle.

9. The method according to claim 3, wherein determining the network user flow minimum control function as the fitness function, and optimizing a plurality of population particles by using the immune particle swarm optimization algorithm, so as to obtain the optimal population particle comprises:

calculating fitness of each of the population particles;

setting a number of iterations t to be 1, and starting iteration calculation;

a first calculation step: calculating concentration of the population particles;

a division step: dividing the population particles of which the fitness is higher than an average value of fitness of all the population particles and the concentration is lower than an average value of concentration of all the population particles into sub-group $S_A$, and dividing remaining population particles into sub-group $S_B$;

a first update step: performing position update on the sub-group $S_A$ to obtain updated sub-group $S_A$, calculating multiple population particle fitness of the updated sub-group SA, and updating individual optimality $$p_{best\_A}^t$$

of the sub-group $S_A$ according to a fitness competition mechanism;

a vaccination step, extracting vaccine information according to a vaccine selection method, and vaccinating the subgroup $S_B$ to obtain vaccinated sub-group $S_B$;

a second calculation step, calculating fitness of the vaccinated sub-group $S_B$, and updating individual optimality $$p_{best\_B}^t$$

of the vaccinated sub-group $S_B$ according to the fitness competition mechanism;

a second update step: synthesizing the updated sub-group $S_A$ and the vaccinated sub-group $S_B$ into a population $S_C$, performing position updating on the population $S_C$ to obtain updated population $S_C$, calculating multiple population fitness of the updated population $S_C$, and updating individual optimality $$p_{best}^t$$

and global optimality $$p_{gbest}^t$$

of the updated population $S_C$ according to the fitness competition mechanism;

repeating the first calculation step, the division step, the first update step, the vaccination step, the second calculation step and the second update step at least once in sequence until the individual optimal $$p_{best}^t$$

and the global optimal $$p_{gbest}^t$$

meet a target requirement or the number of iterations t is greater than a maximum number of iterations, and exiting cycle and outputting the optimal population particle.

10. The method according to claim 4, wherein determining the network user flow minimum control function as the fitness function, and optimizing a plurality of population particles by using the immune particle swarm optimization algorithm, so as to obtain the optimal population particle comprises:

calculating fitness of each of the population particles;

setting a number of iterations t to be 1, and starting iteration calculation;

a first calculation step: calculating concentration of the population particles;

a division step: dividing the population particles of which the fitness is higher than an average value of fitness of all the population particles and the concentration is lower than an average value of concentration of all the population particles into sub-group $S_A$, and dividing remaining population particles into sub-group $S_B$;

a first update step: performing position update on the sub-group $S_A$ to obtain updated sub-group $S_A$, calculating multiple population particle fitness of the updated sub-group $S_A$, and updating individual optimality $$p^t_{best\_A}$$

of the sub-group $S_A$ according to a fitness competition mechanism;

a vaccination step, extracting vaccine information according to a vaccine selection method, and vaccinating the subgroup $S_B$ to obtain vaccinated sub-group $S_B$;

a second calculation step, calculating fitness of the vaccinated sub-group $S_B$, and updating individual optimality $$p^t_{best\_B}$$

of the vaccinated sub-group $S_B$ according to the fitness competition mechanism; a second update step: synthesizing the updated sub-group $S_A$ and the vaccinated sub-group $S_B$ into a population $S_C$, performing position updating on the population $S_C$ to obtain updated population $S_C$, calculating multiple population fitness of the updated population $S_C$, and updating individual optimality $$p^t_{best}$$

and global optimality $$p^t_{gbest}$$

of the updated population $S_C$ according to the fitness competition mechanism;

repeating the first calculation step, the division step, the first update step, the vaccination step, the second calculation step and the second update step at least once in sequence until the individual optimal $$p^t_{best}$$

and the global optimal $$p^t_{gbest}$$

meet a target requirement or the number of iterations t is greater than a maximum number of iterations, and exiting cycle and outputting the optimal population particle.

11. The method according to claim 5, wherein determining the network user flow minimum control function as the fitness function, and optimizing a plurality of population particles by using the immune particle swarm optimization algorithm, so as to obtain the optimal population particle comprises:

calculating fitness of each of the population particles;

setting a number of iterations t to be 1, and starting iteration calculation;

a first calculation step: calculating concentration of the population particles;

a division step: dividing the population particles of which the fitness is higher than an average value of fitness of all the population particles and the concentration is lower than an average value of concentration of all the population particles into sub-group $S_A$, and dividing remaining population particles into sub-group $S_B$;

a first update step: performing position update on the sub-group $S_A$ to obtain updated sub-group $S_A$, calculating multiple population particle fitness of the updated sub-group $S_A$, and updating individual optimality $$p^t_{best\_A}$$

of the sub-group $S_A$ according to a fitness competition mechanism;

a vaccination step, extracting vaccine information according to a vaccine selection method, and vaccinating the subgroup $S_B$ to obtain vaccinated sub-group $S_B$;

a second calculation step, calculating fitness of the vaccinated sub-group $S_B$, and updating individual optimality $$p^t_{best\_B}$$

of the vaccinated sub-group $S_B$ according to the fitness competition mechanism;

a second update step: synthesizing the updated sub-group $S_A$ and the vaccinated sub-group $S_B$ into a population $S_C$, performing position updating on the population $S_C$ to obtain updated population $S_C$, calculating multiple population fitness of the updated population $S_C$, and updating individual optimality $$p^t_{best}$$

and global optimality $$p^t_{gbest}$$

of the updated population $S_C$ according to the fitness competition mechanism;

repeating the first calculation step, the division step, the first update step, the vaccination step, the second calculation step and the second update step at least once in sequence until the individual optimal $$p^t_{best}$$

and the global optimal $$p_{gbest}^t$$

meet a target requirement or the number of iterations t is greater than a maximum number of iterations, and exiting cycle and outputting the optimal population particle.

12. The method according to claim 2, wherein performing power Internet of Things flow control according to the variables of the optimal population particle comprises:

determining the flow control quantity of each network user according to the parameter of the optimal population particle, so that a sum of all the flow control quantity of the network users is the smallest.

13. The method according to claim 3, wherein performing power Internet of Things flow control according to the variables of the optimal population particle comprises:

determining the flow control quantity of each network user according to the parameter of the optimal population particle, so that a sum of all the flow control quantity of the network users is the smallest.

14. The method according to claim 4, wherein performing power Internet of Things flow control according to the variables of the optimal population particle comprises:

determining the flow control quantity of each network user according to the parameter of the optimal population particle, so that the sum of all the flow control quantity of the network users is the smallest.

15. The method according to claim 5, wherein performing power Internet of Things flow control according to the variables of the optimal population particle comprises:

determining the flow control quantity of each network user according to the parameter of the optimal population particle, so that a sum of all the flow control quantity of the network users is the smallest.

16. A non-transitory computer readable storage medium, wherein the non-transitory computer readable storage medium comprises a stored program, wherein when the program runs, a device where the non-transitory computer readable storage medium is located is controlled to execute a method, wherein the method comprising: determining a probability formula for reduction of network user flow according to a probability formula of signal power over-limit, a probability formula of poor quality of service, a probability formula of channel congestion and a probability formula of signal transmission delay occurring in each channel, the probability formula for reduction of network user flow is a formula for calculating probability of reducing network user flow; determining a probability formula for cascading flow reduction of N network users according to the probability formula for reduction of network user flow, wherein $1 \leq N \leq N_v$, and $N_v$ is a number of network users, the probability formula for cascading flow reduction of N network users is a formula for calculating probability of reducing cascading flow of N network users; establishing a network user flow minimum control quantity function according to the probability formula for cascading flow reduction of N network users, wherein the network user flow minimum control quantity function is a function for calculating a minimum value of network user flow control quantity when cascading flow of N network users is reduced; determining a plurality of population particles according to value ranges corresponding to parameters of the network user flow minimum control quantity function, wherein variables of the population particles comprise all the parameters of the network user flow minimum control quantity function and the values of the parameters in the population particles are different; determining the network user flow minimum control quantity function as a fitness function, and optimizing a plurality of population particles by using an immune particle swarm optimization algorithm, so as to obtain an optimal population particle; performing power Internet of Things flow control according to the parameters of the optimal population particle.

17. A computer program product, comprising a computer program stored on a non-transitory computer readable storage medium, wherein the computer program implements a method when being executed by a processor, wherein the method comprising: determining a probability formula for reduction of network user flow according to a probability formula of signal power over-limit, a probability formula of poor quality of service, a probability formula of channel congestion and a probability formula of signal transmission delay occurring in each channel, the probability formula for reduction of network user flow is a formula for calculating probability of reducing network user flow; determining a probability formula for cascading flow reduction of N network users according to the probability formula for reduction of network user flow, wherein $1 \leq N \leq N_v$, and $N_v$ is a number of network users, the probability formula for cascading flow reduction of N network users is a formula for calculating probability of reducing cascading flow of N network users; establishing a network user flow minimum control quantity function according to the probability formula for cascading flow reduction of N network users, wherein the network user flow minimum control quantity function is a function for calculating a minimum value of network user flow control quantity when cascading flow of N network users is reduced; determining a plurality of population particles according to value ranges corresponding to parameters of the network user flow minimum control quantity function, wherein variables of the population particles comprise all the parameters of the network user flow minimum control quantity function and the values of the parameters in the population particles are different; determining the network user flow minimum control quantity function as a fitness function, and optimizing a plurality of population particles by using an immune particle swarm optimization algorithm, so as to obtain an optimal population particle; performing power Internet of Things flow control according to the parameters of the optimal population particle.

18. The non-transitory computer readable storage medium according to claim 16, wherein before determining the probability formula for reduction of network user flow according to the probability formula of signal power over-limit, the probability formula of poor quality of service, the probability formula of the channel congestion and the probability formula of signal transmission delay occurring in each channel comprises:

establishing the probability formula of signal power over-limit occurring in each channel $$p_{Li,t}^P = \exp\left[\frac{K_{Li,t}^P (P_{Li,t} - P_{Li,t}^{re})}{P_{Li,t}^{re}}\right] - K_{Li,t}^P,$$

wherein $$k_{Li,t}^P$$

is an influence coefficient of a signal power of an i-th channel at a moment t on flow control, $P_{Li,t}$ is a signal power of the i-th channel at the moment t, $$P_{Li,t}^{re}$$

is a maximum signal power allowed for the i-th channel at the moment t, and $$K_{Li,t}^{P}$$

is a signal power control coefficient of the i-th channel at the moment t; establishing the probability formula of poor quality of service occurring in each channel $$p_{Li,t}^{S} = \exp\left[\frac{K_{Li,t}^{S}(S_{Li,t} - S_{Li,t}^{re})}{S_{Li,t}^{re}}\right] - k_{Li,t}^{S},$$

wherein $$k_{Li,t}^{S}$$

is an influence coefficient of quality of service of the i-th channel on flow control at a moment t, $S_{Li,t}$ is quality of service of the i-th channel at the moment t, $$S_{Li,t}^{re}$$

is normal quality of service of the i-th channel at the moment t, and $$K_{Li,t}^{S}$$

is a quality of service control coefficient of the i-th channel at the moment t; establishing the probability formula of channel congestion occurring in each channel $$p_{Li,t}^{ZS} = \exp\left(\frac{V_{Li,t}}{K_{Li,t}^{ZS}} - 1\right) - k_{Li,t}^{ZS},$$

wherein $$k_{Li,t}^{ZS}$$

is an influence coefficient of the i-th channel blocking state on flow control at a moment t, $V_{Li,t}$ a blocking degree of the i-th channel at the moment t, and $$K_{Li,t}^{ZS}$$

is a bandwidth coefficient related to a channel design parameter and flow control;

establishing the probability formula of signal transmission delay occurring in each channel $$p_{Li,t}^{SY} = \exp\left(\frac{t_{Li,t}}{K_{Li,t}^{SY}} - 1\right) - k_{Li,t}^{SY},$$

wherein $$k_{Li,t}^{SY}$$

is an influence coefficient of the i-th channel transmission time at a moment t on flow control, $t_{Li,t}$ is a signal transmission time of the i-th channel at the moment t, and $$K_{Li,t}^{SY}$$

is a coefficient related to a channel design parameter and flow control.

19. The non-transitory computer readable storage medium according to claim 16, wherein determining the probability formula for reduction of network user flow according to the probability formula of signal power over-limit, the probability formula of poor quality of service, the probability formula of channel congestion and the probability formula of signal transmission delay occurring in each channel, the method comprising:

calculating the probability of one or more of signal power over-limit, poor quality of service, channel blockage and signal transmission delay occurring in any channel according to the probability formula of the signal power over-limit, the quality of service under-limit, the channel blockage and the signal transmission delay occurring in each channel, so as to obtain the probability formula for reduction of network user flow $$p_L = 1 - \prod_{i=1}^{N_L}(1 - p_{Li,t}^{P}) - \prod_{i=1}^{N_L}(1 - p_{Li,t}^{S}) - \prod_{i=1}^{N_L}(1 - p_{Li,t}^{ZS}) - \prod_{i=1}^{N_L}(1 - p_{Li,t}^{SY}),$$

$N_L$ is a number of channel.

20. The non-transitory computer readable storage medium according to claim 16, wherein determining the probability formula for cascading flow reduction of N network users according to the probability formula for reduction of network user flow comprises:

according to the probability formula for reduction of network user flow $p_L$, determining the probability formula for cascading flow reduction of N network users, $$p_v^{MU} = \begin{cases} p_L & 1 \text{ network user traffic is decreased} \\ k_v^{2U} p_L & 2 \text{ network user traffic is decreased} \\ k_v^{3U} p_L & 3 \text{ network user traffic is decreased} \\ \vdots \\ k_v^{N_v U} p_L & N_v \text{ network user traffic is decreased} \end{cases}$$

$$p_v^{MU}$$

is a probability of network users suffering cascading flow is reduced, and $$k_v^{2U}, k_v^{3U}, \cdots, k_v^{N_V U}$$

are respectively coefficients of 2, 3, . . . , $N_v$ network users suffering cascading flow is reduced.

* * * * *